US006940965B1

(12) United States Patent
Arnold et al.

(10) Patent No.: US 6,940,965 B1
(45) Date of Patent: *Sep. 6, 2005

(54) TELEPHONIC APPARATUS WITH AUTOMATIC AREA CODE DIALING CAPABILITY RESPONSIVE TO DIALING KEY OPERATION

(76) Inventors: Bruce H. Arnold, 21633 Bernice Ave., Torrance, CA (US) 90503; Michael J. Bolan, 16 Bristlecone, Irvine, CA (US) 92620

( * ) Notice: Subject to any disclaimer, the term of this patent is extended or adjusted under 35 U.S.C. 154(b) by 493 days.

This patent is subject to a terminal disclaimer.

(21) Appl. No.: 09/612,479

(22) Filed: Jul. 7, 2000

(51) Int. Cl.[7] .............................. H04M 1/00; H04M 3/00
(52) U.S. Cl. ............................... 379/355.02; 379/355.08
(58) Field of Search ...................... 379/355.03, 357.01, 379/354, 355.01, 355.02, 355.05, 355.06, 355.07, 355.08, 355.09, 355.1, 356.01; 455/565, 564, 566

(56) References Cited

U.S. PATENT DOCUMENTS

| | | | | |
|---|---|---|---|---|
| 5,157,719 A | * | 10/1992 | Waldman | 379/356 |
| 5,268,959 A | * | 12/1993 | Hong | 379/356 |
| 5,305,372 A | * | 4/1994 | Tomiyori | 379/355.01 |
| 5,754,602 A | | 5/1998 | Landry et al. | 379/355 |
| 5,796,810 A | | 8/1998 | Lim et al. | |
| 5,917,904 A | | 6/1999 | Theis | |
| 5,963,636 A | | 10/1999 | Boakes | 379/355 |
| 5,966,436 A | | 10/1999 | Kim | 379/216 |
| 6,137,877 A | | 10/2000 | Robin et al. | |
| 6,192,124 B1 | * | 2/2001 | Yim | 379/356 |
| 6,292,557 B1 | * | 9/2001 | Gabara | 379/355.08 |
| 6,405,059 B2 | * | 6/2002 | De-Crouy Chanel | 455/564 |
| 6,567,675 B1 | * | 5/2003 | Rosen et al. | 455/564 |
| 6,643,369 B1 | * | 11/2003 | DiMarco | 379/352 |

* cited by examiner

Primary Examiner—Rexford Barnie
(74) Attorney, Agent, or Firm—Michael J. Bolan

(57) ABSTRACT

A telephonic apparatus that minimizes the number of keystrokes required to make a local phone call in an area code overlay region is provided. If a user enters a local phone number into the telephonic apparatus, the telephonic apparatus, in turn, automatically recalls a stored area code and dials it prior to dialing the local phone number. The recalled area code may be either the base area code or the overlaying area code within the area code overlay region. Thus, a user need only enter a local phone number when attempting to make a local phone call within the area code overlay region, which would otherwise require the user to enter a long distance phone number. If a user, on the other hand, enters a long distance phone number into the telephonic apparatus, the telephonic apparatus, in turn, dials the long distance phone number in a standard manner.

48 Claims, 23 Drawing Sheets

TELEPHONIC APPARATUS WITH AUTOMATIC AREA CODE DIALING CAPABILITY RESPONSIVE TO DIALING KEY OPERATION

RELATED APPLICATIONS

The subject matter disclosed in the present invention application is related to the subject matter disclosed in application Ser. Nos. 09/612,478 and 09/612,203, both of which have been filed on the same date by the present inventors, and both of which are fully and expressly incorporated herein by reference.

FIELD OF THE INVENTION

The present inventions relate to apparatus and methods for providing an efficient dialing scheme within a telephonic apparatus.

BACKGROUND OF THE INVENTION

The North American Numbering Plan (NANP), which is the present day area code system, was designed by AT&T and Bell Laboratories in the 1940's in order to make it possible to route long distance phone calls automatically. A telephone number implemented in accordance with the NANP includes ten digits, the first three digits of which form the area code and identify the geographic area in which the called party lives, the second three digits of which identify the central office or switch within the area code, and the last four digits of which identify the individual telephone line numbers. Although there are theoretically 1000 blocks of phone numbers (ten thousand phone numbers for each block) available for each code, currently, only 792 blocks of phone numbers are actually available, assuming that some phone numbers, such as 0, 1, and 911 cannot be used. State utilities regulators allocate these blocks of phone numbers among individual phone companies on an as-needed basis, without regard to whether all of the phone numbers within the previously allocated blocks have been assigned to their customers. Once the respective state utilities regulator has allocated all of the phone number blocks in a particular area code, a new area code must be added to supplement the coverage of the old area code by implementing an area code split or an area code overlay system. There are 680 usable area codes available for assignment, with over 255 area codes being in service within the United States and other countries, such as Canada and a number of Caribbean nations.

With regard to the area code split system, a region having one area code is split into two regions having separate area codes, with one region retaining the old area code and a second region acquiring a new area code. For example, a large region that previously was assigned "679" as the area code could be split into two smaller regions with respective area codes "679" and "313," as was demonstrated in the greater Los Angeles region in the 1980's. The benefit of the geographical split system over the overlay system is that a particular geographical region is defined by a single area code. The disadvantage, however, is that such geographical area code splitting is frustrating, inconvenient, and costly to consumers and industry. When area codes change, consumers have to notify acquaintances of the change and reprogram telecommunications equipment and home-alarm equipment, while businesses must reprint stationery, update customer-contact databases, and risk losing old customers who do not have their new area code. This inconvenience is heightened when users living in the same area code, prior to the area code split, must now dial an extra four digits ("1" and the three-digit area code) when calling between the split regions.

Less common, but being used more frequently, the area code overlay system involves overlaying the new area code over the old area code, i.e., all new phone lines that are incorporated into a region having a specific area code are given a new code. This is seen as being less disruptive than geographically splitting a region into two area codes, since no current phone number is subjected to an area code change. The overlay system, however, does have certain disadvantages. For example, a particular geographical region may be defined by more than one area code, in which case, a particular household or business having an existing phone line may reside in two different area codes if another phone line is installed subsequent to the overlay implementation. Significantly, all users within an area code overlaying region must dial a long distance phone number, i.e., an additional four digits, even if they reside in the same area code region. Currently, the state of Maryland, and certain cities in Texas, Georgia, Florida, and Colorado, have implemented area code overlay systems. Cities in California and Pennsylvania plan to implement such systems in the near future.

In the last two decades, the number of area code additions has dramatically increased due to the proliferation of fax machines, online services, cellular phones, pagers, automatic teller machines, credit card approval systems, etc., as well as the increased number of local phone numbers to which blocks of phone numbers must be assigned. By way of example, the United States had one hundred nineteen area codes in service in 1991, which has almost doubled to two hundred fifteen today. It is projected that, between 1992 and 2002, the number of area codes in California, alone, will increase from thirteen to forty-one.

As a result of the increase in area code additions, there has been an increased pressure on state utilities regulators to implement area code conservation plans to slow the proliferation of such area code splits and overlays. Such plans may involve efficiently allocating phone numbers, e.g., by reducing the number of phone numbers allocated to a particular phone company at one time from ten thousand to one thousand. Also, these plans may involve conserving phone numbers by requiring phone companies to give back unused phone numbers for redistribution. Ultimately, the extended life of any given area code depends on when the phone conservation process is initiated, how many numbers are allocated, how many numbers are reclaimed, and the demand of numbers. Area code conservation plans are largely untested, however, and any success that may result from the implementation of any of these plans is questionable. Regardless of the extent to which the life of an area code is positively impacted by the implementation of an area code conservation plan, these measures are seen as a temporary fix since the demand for phone numbers will eventually exceed the phone number supply, thereby necessitating the addition of area codes.

There thus remains a need for apparatus and methods that minimize any annoyance that may be presented to users residing in geographic regions where split or overlay area code systems have been implemented.

SUMMARY OF THE INVENTION

The present inventions are directed to methods and apparatus that obviate the need for a user of a telephonic apparatus to dial an area code when making a call that would otherwise require the user to dial the area code. The telephonic apparatus can be any self-contained device that allows a user to dial a phone number, e.g., a land-line telephone, wireless telephone, facsimile machine, computer, etc., thereby providing a commercially viable and mass producible platform from which to perform the method.

In accordance with a first aspect of the present inventions, a method for dialing a phone number that has an area code and a local phone number is provided. This novel method comprises storing the area code within the telephonic apparatus. Storage of the area code can be accomplished using any of a variety of programming methodologies, and can be effected by either the user or the manufacturer of the telephonic apparatus. Preferably, the stored area code is displayed to the user. The method further comprises entering the local phone number into the telephonic apparatus, and automatically recalling the stored area code. The recalled area code and entered local phone number are then sequentially transmitted from the telephonic apparatus by transmitting corresponding dual tone multi-frequency (DTMF) signals. In the preferred method, a long distance access number, such as the single digit "one," or a multi-digit long distance access number, is transmitted prior to transmitting the recalled area code. This long distance access number can either be stored with the area code, or separately therefrom, in which case, the long distance access number is recalled prior to its transmission.

The area code can be recalled in response to the last of one or more initial digits of the entered local phone number, in which case, the area code, one or more entered initial digits of the local phone number, and remaining entered digits of the local phone number are sequentially transmitted. In this case, the one or more entered initial digits are stored when received and recalled prior to its transmission. The area code can also be recalled in response to a phone number transmission key, e.g., a send key on a wireless telephone.

Although the present inventions should not be so limited, the recalled area code and entered local phone number can be transmitted from an area code overlay region (i.e., transmitted from a device installed within the area code overlay region), in which case, the recalled area code can be the base area code or overlaying area code. This implementation can be advantageously used to minimize the number of digits entered by the user in making a local phone call within the area code overlay region. The recalled area code and entered local phone number can also be transmitted from a standard area code region (i.e., a region in which an area code overlay has not been implemented) having a first area code, in which case, the stored area code can be a second area code different from the first area code. This implementation can be advantageously used to minimize the number of digits entered by the user in making a long distance phone call to a frequently called region. In the preferred method, a plurality of area codes, e.g., the three area codes immediately described above, can be stored in the telephonic apparatus, in which case, the recalled and transmitted area code can correspond with a selected one of the plurality of stored area codes. In this case, the particular area code displayed to the user, if displayed at all, is preferably the area code with which the telephonic apparatus is activated, i.e., the selected area code.

In accordance with a second aspect of the present inventions, a method for making a call from the telephonic apparatus is provided. This novel method comprises storing the area code within the telephonic apparatus, and entering a phone number into the telephonic apparatus. The method further comprises determining if the entered phone number is a local phone number. If the entered phone number is a local phone number, the stored area code is recalled, and it and the entered phone number are sequentially transmitted. Again, a long distance access number is preferably transmitted before the transmission of the recalled area code. If the entered phone number is not a local phone number, the entered phone number is transmitted without recalling and transmitting the stored area code. The entered phone number may be advantageously transmitted from an area code overlay region or a standard area code region.

Determination of whether the entered phone number is a local number can be accomplished in a variety of ways, including determining the characterization of one or more digits of the entered phone number or the total number of digits contained within the entered phone number. For example, if the first digit of the entered phone number is not the first digit of a long distance access number (e.g., it is not a "one"), or the total number of digits in the entered phone number is equal to seven, the entered phone number is determined to be a local phone number.

In accordance with a third aspect of the present inventions, a telephonic apparatus for dialing a phone number having an area code and a local phone number is provided. The novel telephonic apparatus comprises a user interface for allowing a user to enter the local phone number, a memory configured for storing the area code, and a transmitter. By way of non-limiting example, the user interface can be embodied in a keypad, the memory can be non-volatile, and the transmitter can be embodied in a dual tone multi-frequency (DTMF) transmitter. The telephonic apparatus further includes control circuitry, which, by way of non-limiting example, can be embodied in a central processing unit (CPU). The control circuitry is coupled to the user interface and is configured for receiving the entered local phone number therefrom. The control circuitry is further coupled to the memory, and is configured for recalling the area code stored therein. The control circuitry is lastly coupled to the transmitter, and is configured for controlling the transmitter to sequentially transmit the recalled area code and the entered local phone number.

The control circuitry can be configured for recalling the area code from the memory in response to the last of one or more initial digits of the entered local phone number, and controlling the transmitter to sequentially transmit the area code, one or more initial digits of the local phone number, and remaining entered digits of the local phone number. In this case, the control circuitry is configured for storing the one or more initial digits of the entered phone number in the memory, when received, and recalling them prior to their transmission. Optionally, the user interface can include a phone number transmission key, in which case, the control circuitry can be configured for recalling the area code from the memory in response to the operation of the phone number transmission key.

In the preferred embodiment, the control circuitry is further configured for controlling the transmitter to transmit a long distance access number prior to transmitting the area code. The long distance access number may be stored in the memory with the area code, in which case, the control circuitry is configured for recalling the long distance access number therefrom prior to its transmission. The telephonic apparatus may optionally include a display, in which case, the control circuitry is coupled to the display and configured for controlling the display to exhibit the stored area code to a user. Preferably, the telephonic apparatus comprises a housing in which the user interface, memory, transmitter, and control circuitry are contained.

In the preferred embodiment, the user interface comprises a keypad having a plurality of area code selection keys. The control circuitry is further configured for selecting one of a plurality of area codes stored in the memory in response to operation of a corresponding one of the plurality of area code selection keys. In this case, the area code recalled in response to entry of the local phone number through the keypad is the selected area code. In the preferred embodiment, the keypad also comprises an area code programming key, and is further configured for allowing the user to enter the area code. In this case, the control circuitry is further configured for storing the area code in the memory in response to operation of the area code programming key and entered area code. The area code programming key can be either non-dedicated, e.g., a "#" or "*" key, or dedicated, meaning that its operation only affects area code related functions.

In accordance with a fourth aspect of the present inventions, a telephonic apparatus for making a call is provided. The telephonic apparatus comprises a user interface configured for allowing a user to enter a phone number, a memory configured for storing an area code, and a transmitter. The telephonic apparatus further comprises control circuitry that is coupled to the user interface, memory, and transmitter, and is configured for receiving the phone number from the user interface, and for determining if the received phone number is a local phone number, e.g., by determining a characterization of one or more digits contained with the received phone number, or determining a total number of digits contained with the received phone number. The control circuitry is further configured for recalling the area code from the memory and controlling the transmitter to sequentially transmit the recalled area code and entered phone number if the received phone number is a local phone number, and for controlling the transmitter to transmit the received phone number without recalling and transmitting the area code if the received phone number is not a local phone number.

In the preferred embodiment, if the received phone number is a local phone number, the control circuitry is configured for controlling the transmitter to transmit a long distance access number (e.g., the single digit "one," or a multi-digit long distance access number that includes the digit "one" as its first digit) prior to transmitting the recalled area code. This long distance access number can either be stored with the area code, or separately therefrom, in which case, the long distance access number is recalled prior to its transmission.

Other and further objects, features, aspects, and advantages of the present inventions will become better understood with the following detailed description of the accompanying drawings.

BRIEF DESCRIPTION OF DRAWINGS

The drawings illustrate both the design and utility of preferred embodiments of the present inventions, in which.

DETAILED DESCRIPTION OF THE DRAWINGS

Figure 1:
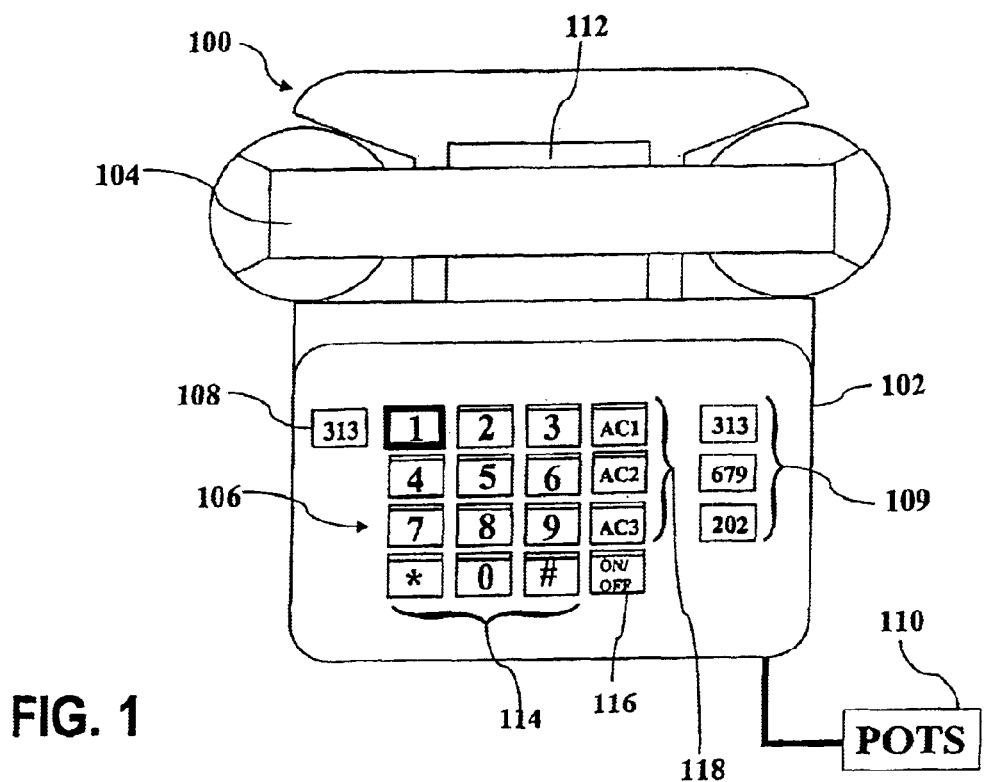
FIG. 1 is a plan view of a preferred automatic area code dialing telephone constructed in accordance with the present inventions.

Referring to FIG. 1, an automatic area code dialing telephone 100 constructed in accordance with the present inventions is described. The telephone 100 is illustrated as a land-line telephone that is connected to a communications network 110, and specifically, Plain Old Telephone Service (POTS). The present inventions should not be limited to a telephone and POTS, however, and can be associated with any telephone and communications network that allows a user to place a telephone call to another device. For example, the telephone 100 can alternatively be a cellular or mobile telephone, in which case, the communications network 110 will be a wireless communications network. It should be noted that the present inventions are not to be limited to telephones, and can be incorporated into any self-contained device that has the ability to dial a phone number, e.g., a facsimile machine.

The telephone 100 generally includes a telephone housing 102, handset 104, keypad 106, an activated area code display 108, and a plurality of programmed area code displays 109. The telephone housing 102 houses the telephone circuitry, which, as will be discussed in further detail below, allows telephone calls to be made from the telephone 100 with a minimal amount of keystrokes. The telephone housing 102 further includes a handset cradle 112 on which the handset 104 rests when the telephone 100 is not being used. The handset 104 is conventionally used to provide a means for the user to alternately initiate and terminate communication between the telephone 100 and POTS 110. Specifically, when the handset 104 is removed from the cradle 112, the telephone 100 is placed into an off-hook state, thereby initiating communication with POTS 110. When the handset 104 is placed back on the cradle 112, the telephone 100 is placed into an on-hook state, thereby terminating communication with POTS 110. It should be noted that, in the case of a mobile, cellular, or portable telephone, communication between the telephone and the communications network may be alternately initiated and terminated by means, such as a dedicated function key, as will be described in further embodiments described below. In this case, a separate handset may not be necessary.

The keypad 106 includes dialing keys 114, which encompass the numerical keys (i.e., the "zero" through "nine" keys), as well as "*" and "#" keys. The keypad 106 further includes a "smart phone"/"standard phone" toggle key 116, the operation of which allows the user to alternately switch the telephone 100 between "smart phone" and "standard phone" modes. As will be discussed in further detail below, the telephone 100, when in the "smart phone" mode, efficiently eliminates keystrokes required to dial a telephone number under certain circumstances by automatically dialing an area code with which the telephone 100 is activated. When in the "standard phone" mode, the telephone 100 acts as a standard telephone would, requiring as many keystrokes as there are digits in the telephone number. The keypad 106 also includes a plurality of area code selection keys 118 (in this case, three), which allows a user to activate the telephone 100 with a selected one of a plurality of corresponding area codes programmed into the telephone 100. The keypad 106 may include additional keys, which, for purposes of brevity, will not be discussed.

The activated area code display 108, which, in the preferred embodiment, is an LCD, exhibits the area code (in this case, "313") with which the telephone 100 is currently activated. If the telephone 100 is not currently activated with any area code, e.g., if the telephone 100 is placed in the "standard" mode via operation of the "smart phone"/"standard phone" toggle key 116, the activated area code display 108 exhibits the word "OFF," or any other word that indicates that the telephone 100 is in the "standard" mode. The programmed area code displays 109, which, in the preferred embodiment, are also LCD's, exhibit the area codes (in this case, "313," "679," and "202") with which the telephone 100 is currently programmed.

In general, when in the "smart phone" mode, the telephone 100 is configured, such that an area code overlay, if implemented within the region where the telephone 100 is installed, is transparent to the user when a telephone call is attempted from the telephone 100. Specifically, the user need only dial the seven-digit local phone number when a local phone call is made, and must dial the eleven-digit long distance phone number when a long distance phone call is made, making it appear as if the call, whether it be local or long distance, is made from a region in which an area code overlay has not been implemented. As previously discussed, when using a standard telephone, the user must dial an eleven-digit phone number from an area code overlay region regardless of the locality of the call.

For the purposes of this specification, a local phone number is any phone number without the long distance access number and area code, and a long distance phone number is any phone number that includes the long distance access number, area code, and local phone number. Thus, calls made between devices that reside in the same area code overlay region may be made by dialing a long distance phone number if the dialing of the long distance access number and area code is required. A long distance access number is any number that indicates to POTS 110 that the area code and local phone number will need to be dialed in order to complete the long distance phone call. In this case, the long distance access number is the single-digit "one." A local phone number does not encompass any number that begins with a "zero," such as "0" (operator), "01" (direct international access number), or "011" (operator assisted international access number). A local phone number also does not encompass a special service phone number, such as the three-digit phone numbers "411" (directory assistance), "611" (repair service), "911" (emergency service), "*69" (call return), "66" (repeat calling), "*60" (call screening), "*61" (priority ringing), "*77" (anonymous call rejection), "72#" (call forwarding), "74#" (speed calling), etc.

For the purposes of this specification, a call made between two devices residing in the same area code overlay region is considered to be a local phone call. Thus, a call made between a device that is assigned a base area code (i.e., the old area code over which the new area code is being overlaid) and a device that is assigned an overlaying area code (i.e., the new area code that is being laid over the new area code) would still be considered a local phone call, although a long distance phone number must be made to establish communication between the two devices. In contrast, a call made between a device residing within a particular area code overlay region and a device residing outside of the particular area code overlay region is considered to be a long distance phone call.

In making an area code overlay region transparent to the user, the telephone 100 automatically dials the single-digit long distance access number and the particular three-digit area code with which the telephone 100 is activated when the user attempts to make a local phone call. The telephone 100 then completes the local phone call by dialing the local phone number as entered by the user. Thus, when dialing locally within an area code overlay region, seven digits, rather than the normal eleven digits, need only be dialed by the user, in effect, eliminating four key strokes. In contrast, when the user attempts to make a long distance phone call, the telephone 100 acts like a standard telephone, dialing the eleven-digit long distance phone number (i.e., the single-digit long distance access number, three-digit area code, and seven-digit local phone number). In effect, the telephone 100 simply dials the long distance phone number in the same manner as a standard telephone would. As will be described in further detail below, the telephone 100 automatically determines the user's intentions in making a local phone call or a long distance phone call by keying off the first digit entered by the user. That is, if the user first dials a "one," the telephone 100 will presume that the user is attempting to make a long distance phone call. If, on the other hand, the user dials a digit other than "one," the telephone 100 will presume that the user is attempting to make a local phone call.

In order to make full use of the telephone 100 within an area code overlay region, two of the area codes programmed into the telephone 100 preferably correspond with the base area code and the overlaying area code. Preferably, if the area code overlay region in which the telephone 100 installed is fairly new, the particular area code with which the telephone 100 is activated will correspond to the base area code, since the area code overlay region will be dominated by the base area code. At the point of maturation, the area code overlay region will presumably contain a 50/50 split of telephone numbers containing the base area code and telephone numbers containing the overlaying area code. In this case, the particular area code with which the telephone 100 is activated will preferably correspond with the base area code or overlaying area code most often called.

Although the telephone 100 has been described above as a means to solve the problems introduced in an area code overlay region, the telephone 100 may have other applications. For example, the telephone 100 may be activated with an area code that corresponds with an area code that is most frequently dialed by the user. Thus, regardless of whether the telephone 100 is installed within an area code overlay region, it may eliminate four key strokes when dialing a long distance phone number that includes an area code with which the telephone 100 is activated. If the telephone 100 is installed within an area code overlay region, in which case, two of the area codes programmed into the telephone 100 may be the base area code and the overlaying area code, the remaining area code programmed into the telephone 100 may correspond to an area code that is most often used to make a long distance phone call. This may be advantageous when the user, e.g., makes a series of calls to a particular area code unrelated to the area code overlay region. In this case, the telephone 100 can be activated with the corresponding area code, if such area code is one of the three area codes programmed into the telephone 100. The telephone 100 can then be activated with one of the other two programmed area codes when the user is finished making the series of calls.

Preferably, there is some identifying feature on the telephone 100 that indicates to a user that the telephone 100 is a "smart phone" that allows the user to place a local phone call from an area code overlay region, or otherwise place a long distance phone call to a frequently called region, without having to dial a long distance phone number. For example, in the illustrated embodiment, the color of the "one" key 114 is darker than the remaining dialing keys 114. In this case, if the user is unsure of whether the telephone 100 is a "smart phone", or otherwise, out of habit, dials the eleven-digit number knowing that the call is made from an area code overlay region, the user of the telephone 100 naturally focuses on the "one" key 114. Noticing that the "one" key is different from the other keys, the user may be reminded that the telephone 100 is indeed a "smart phone," and the long distance access number and area code need not be dialed if the phone number contains the area code with which the telephone 100 is activated, namely, the particular area code that will be automatically dialed by the telephone 100 if a local phone number is dialed. The particular area code exhibited in the activated area code display 108 may also indicate to the user that the telephone 100 is a "smart phone," as well as provide an indication of the particular area code with which the telephone 100 is activated.

The programming of the area codes into the telephone 100 can be effected by the user in any variety of ways. In the illustrated embodiment, the area codes are programmed into the telephone 100 by entering three-digit area codes into the keypad 106 when the telephone 100 is in the on-hook state, and subsequently depressing one of the area code selection keys 118 in response to each entered three-digit area code. For example, the user can program the area code "313" into the telephone 100 by simply entering the digits "three", "one," and "three" into the keypad 106 in order, and then depressing one of the area code selection keys 118. The user can program two other area codes in a similar manner. Alternatively, the telephone 100 can be provided with a dedicated area code programming key (not shown) that can be depressed prior to entering the three-digit area code and depressing a corresponding one of the area code selection keys 118. More alternatively, the telephone 100 can be provided with a non-dedicated area code programming key, such as the "*" or "#" key, which can be depressed prior to entering the three-digit area code and depressing a corresponding one of the area code selection keys 118.

One or more of the area codes can also be programmed into the telephone 100 by the manufacturer. This pre-programming feature is especially suitable if the telephone 100 is a mobile phone, in which case, the area code of the phone number to which the telephone is assigned can be conveniently programmed into the telephone 100 prior to delivery of the telephone to the user. Once the area codes are programmed into the telephone 100, the telephone 100 can be activated with the desired area code by selecting one of the programmed area codes. That is, the user depresses the area code selection key 118 corresponding with the desired area code with which the telephone 100 is to be activated.

Figure 2:
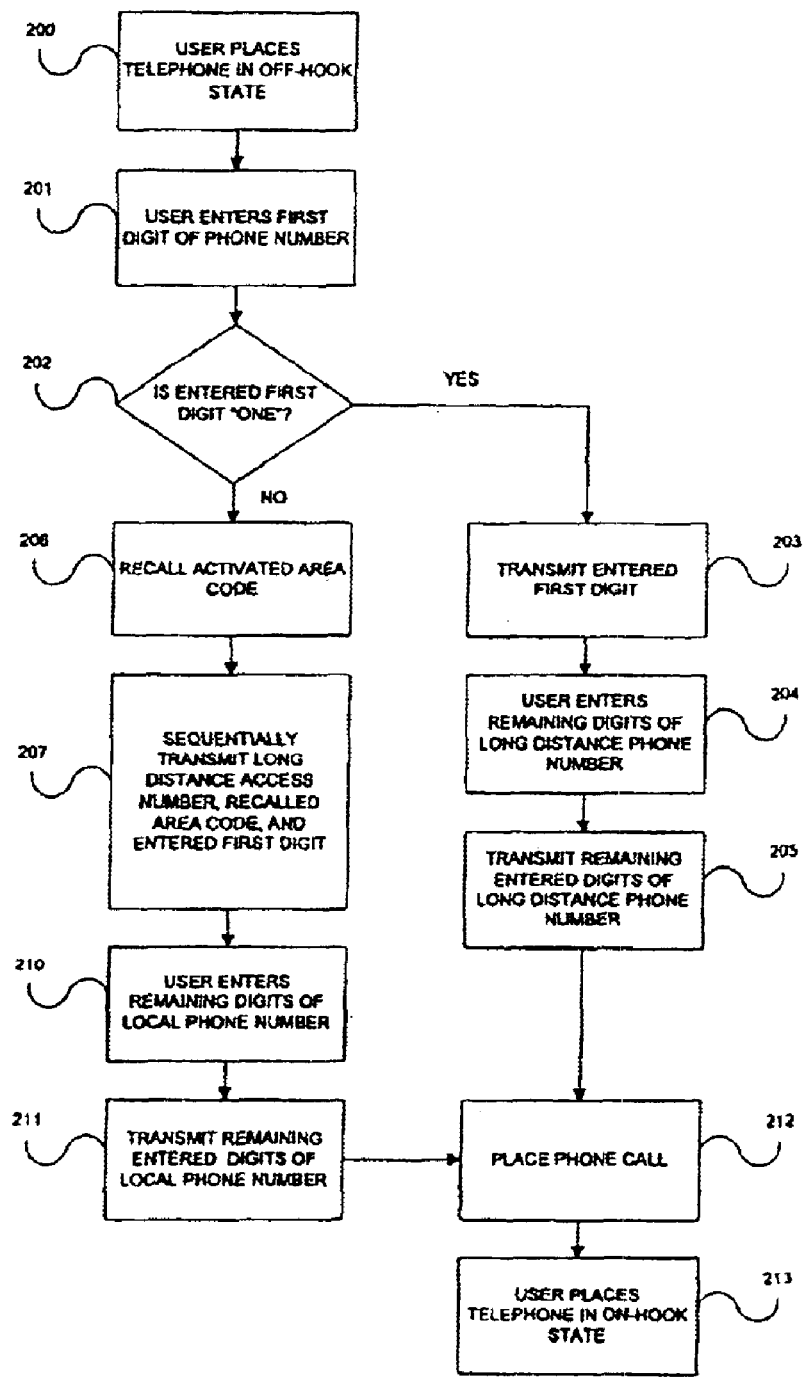
FIG. 2 is a flow diagram illustrating a method used to dial a phone number with the telephone of FIG. 1.

With further reference to FIG. 2, a method for dialing the telephone 100 is performed in accordance with the present inventions. It is presumed that, at this point, the telephone 100 has been placed in the "smart phone" mode, and that the user desires to make a local or long distance phone call that does not involve dialing a special service number. It is also presumed that the telephone 100 is installed in an area code overlay region, and that it is activated with a base or overlaying area code, e.g., "313."

The process begins with the user removing the handset 104 from the cradle 112 to place the telephone 100 in the off-hook state (step 200), thereby establishing communication with POTS 110. Upon establishing communication with POTS 110, i.e., when an audible dial tone is heard, the user initiates the calling process by entering the first digit of the phone number into the keypad 106 (step 201). Presumably, the user, knowing that the telephone 100 is a "smart" telephone, will enter the first digit of the seven-digit local phone number if the call is local, or enter the first digit of the eleven-digit long distance phone number (i.e., the long distance access number) if the call is long distance. In the former case, the first digit will be a digit other than "one," and in the latter case, the first digit will be the digit "one." Thus, to determine whether the user desires to call locally or long distance, the telephone 100 determines whether the first digit of the entered phone number is "one" (step 202).

If the first digit entered by the user is a "one," a long distance phone call is assumed, in which case, the phone number entered by the user will be an entire long distance phone number. In response, the telephone 100, without recalling the activated area code, transmits the "one" to POTS 110 (step 203). The user then enters the remaining digits of the long distance phone number (step 204) into the keypad 106, and in response, the telephone 100 transmits the remaining digits of the long distance phone number to POTS 110 (step 205). It is noted that, if the long distance phone number contains a single digit long distance access number (i.e., "one"), the remaining digits will number ten, and if the long distance phone number contains a multi-digit long distance access number that begins with the digit "one," the remaining digits will number more than ten.

If the first digit entered by the user is other than a "one," a local phone call is assumed, in which case, the phone number entered by the user will be a local phone number. In response, the telephone 100 recalls the activated area code (step 206), and then sequentially transmits the long distance access number, the recalled area code, and the entered first digit to POTS 110 (in this case, "one") (step 207). The user then enters the remaining digits of the local phone number (step 210) into the keypad 106, and in response, the telephone 100 transmits these digits to POTS 110 (step 211).

Once the local phone number or long distance access number has been transmitted to POTS 110, a phone call is placed by POTS 110 to the call destination (step 212). A call that is made in response to steps 203–205 will be a long distance call. In contrast, because the telephone 100 is installed within an area code overlay region, and is programmed by the user with the base or overlaying area code, a call that is made in response to steps 206, 207, 210, and 211 will be a local phone call.

It should be noted, that as long as the telephone 100 is maintained in the off-hook state, the telephone 100 remains responsive to any digits entered into the keypad 106 and transmits the entered digits to POTS 110, without recalling the area code again. In this manner, if the user has called an automated telecommunications service, such as a pager service or customer service, that requires further entry of digits to convey information, the user can subsequently operate the keypad 106 during the call, without inadvertently dialing the preceding number with which the telephone 100 is activated. Upon completion of the phone call, the user places the handset 104 back on the cradle 112 to place the telephone 100 in the on-hook state (step 213), thereby terminating communication with POTS 110. The telephone 100 will then be reset to provide subsequent "smart phone" capabilities.

It is noted that the mode of transmitting the digits of a phone number from a telephonic apparatus will depend upon the telephonic apparatus itself. For example, if the telephonic apparatus is a telephone wired directly to POTS 110, the telephonic apparatus will transmit signals corresponding to the digits of the phone number directly to POTS 110. If the telephonic apparatus is a portable telephone, the telephonic apparatus will wirelessly transmit signals corresponding to the digits of the phone number to a main unit, which will then transmit the signals to POTS 110. If the telephonic apparatus is a cellular or mobile telephone, the telephonic apparatus will wirelessly transmit signals corresponding to the digits of the phone number to a base station of a wireless communications network. If the telephonic apparatus is a telephone connected to a wireless local loop (WLL), the telephonic apparatus will transmit the signals to the local unit, which then will wirelessly transmit the signals to a base station of a wireless communications network.

The method described with respect to FIG. 2 assumes that the user desires to advantageously use the telephone 100 to save keystrokes when dialing a number within an area code overlay region. As previously discussed, the user can advantageously use the telephone 100 in dialing a long distance phone number that contains an area code corresponding to a frequently called region. In this case, the method operates in a manner identical to that illustrated in FIG. 2, with the exception that it is assumed that the telephone 100 has been activated with the frequently called area code. Thus, the long distance phone number dialed in accordance with steps 206, 207, 210, and 210–213 results in the implementation of a long distance phone call rather than a local phone call.

It should be noted that there will be times when the user should operate the telephone 100 in a "standard mode," so that the telephone 100 does not automatically dial the area code with which the telephone 100 is activated in response to entry of digits into the keypad 106. For example, if the user dials a special service number, the user will preferably operate the "smart phone"/"standard phone" toggle key 116 to place the telephone 100 into the "standard phone" mode, thereby preventing the telephone 100 from automatically dialing an area code, which would otherwise interrupt dialing of the special service numbers, the first digits of which do not include the digit "one."

Figure 3:
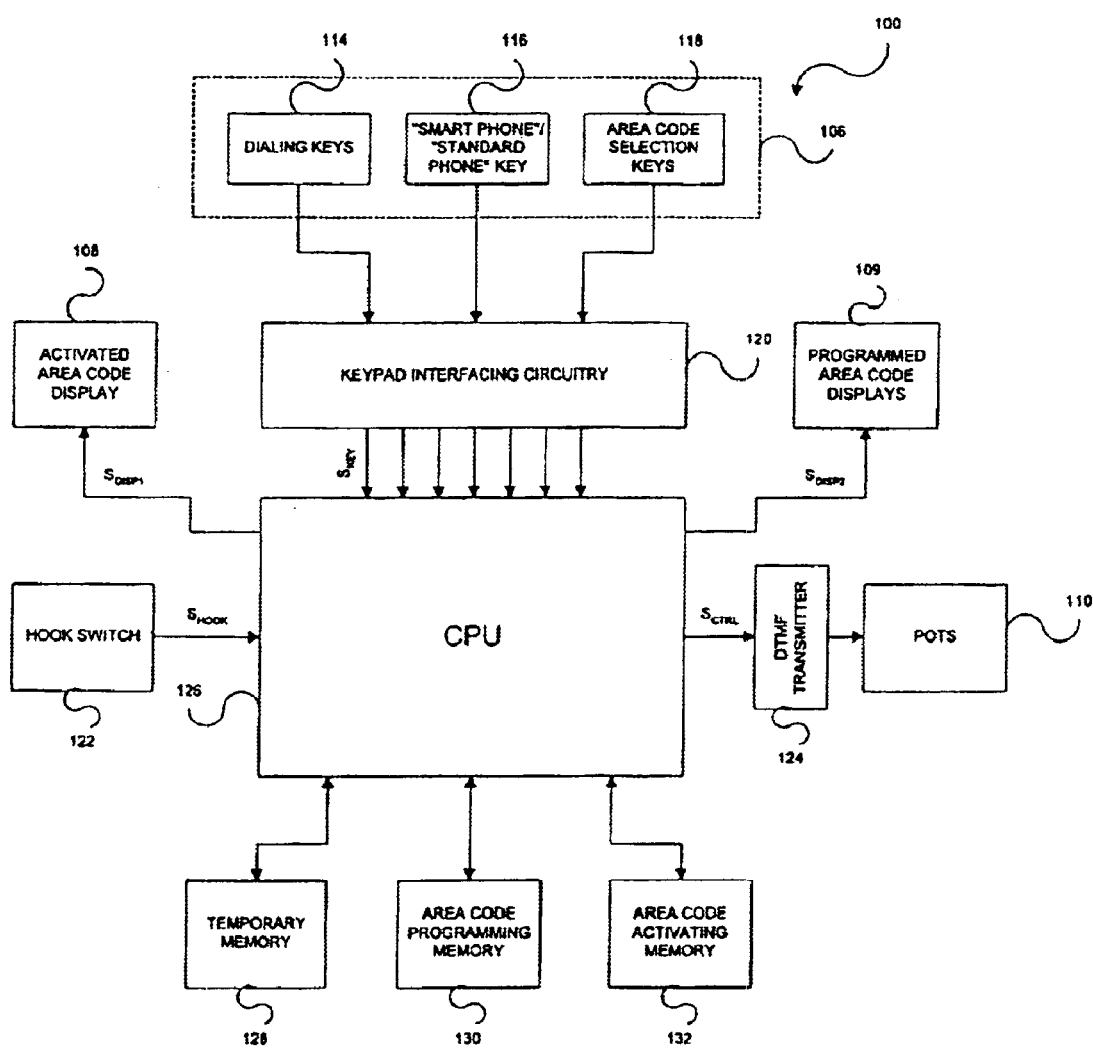
FIG. 3 is a block diagram of the circuitry implemented in the telephone of FIG. 1.

With reference to FIG. 3, the telephone circuitry used to implement the programming and dialing functions described above is described. In general, this circuitry includes the above-described activated area code display 108 and programmed area code displays 109 and keypad 106, which includes the dialing keys 114, "smart phone"/"standard phone" toggle key 116, and area code selection keys 118. The telephone circuitry further includes keypad interfacing circuitry 120, a hook switch 122, a transmitter 124 (in this case, a dual tone multi-frequency (DTMF) transmitter), control circuitry 126 (in this case, a central processing unit (CPU)), temporary memory 128, area code programming memory 130, and area code activating memory 132.

The keypad interfacing circuitry 120, hook switch 122, and DTMF transmitter 124 are all standard components in the telephone manufacturing industry, and are well understood by those skilled in the art of telephone manufacturing. Specifically, the keypad interfacing circuitry 120 is coupled between the keypad 106 and the CPU 126, and is configured for transmitting keypad signals $S_{KEY}$ to the CPU 126 in response to operation of the keypad 106 by the user. That is, the keypad interfacing circuitry 120 generates and transmits a keypad signal $S_{KEY}$ to the CPU 126 corresponding to one of the dialing keys 114, "smart phone"/"standard phone" toggle key 116, and area code selection keys 118 operated on the keypad 106. The hook switch 122 is coupled to the CPU 126 and is configured for generating and transmitting a hook signal $S_{HOOK}$, to the CPU 126, indicating whether the telephone 100 is in an on-hook state or an off-hook state. The hook switch 122 is operated in response to the position of the handset 104 (shown in FIG. 1). That is, if the handset 104 is resting in the cradle 112, the hook signal $S_{HOOK}$ indicates an on-hook state. If, on the other hand, the handset 104 is removed from the cradle 112, the hook signal $S_{HOOK}$ indicates an off-hook condition.

The CPU 126 is coupled to the activated area code display 108, and is configured for generating and transmitting a display signal $S_{DISP1}$ for prompting the display 108 to exhibit the activated area code to the user. The CPU 126 is also coupled to the programmed area code displays 109, and is configured for generating and transmitting display signals $S_{DISP2}$ for prompting the displays 109 to respectively exhibit the programmed area codes. The CPU 126 is coupled to the DTMF transmitter 124, and is configured for generating and transmitting control signals $S_{CTRL}$ for prompting the DTMF transmitter 124 to generate and transmit DTMF signals corresponding with the digits of a phone number to POTS 110. In effect, the CPU 126 employs the DTMF transmitter 124 to place a call via POTS 110.

The CPU 126 is coupled to the area code programming memory 130 and is configured for storing area codes therein during the area code programming process. The particular pool of area codes stored within the area code programming memory 130 will be dictated by keypad signals $S_{KEY}$ generated by the keypad interfacing circuitry 120 in response to user operation of the keypad 106. This programming process will be specific to the particular programming scheme implemented within the telephone 100. As described above, the preferred programming process involves operating the dialing keys 114 corresponding to a desired area code when the telephone 100 is in an on-hook state. The CPU 126 is configured for selecting one of the pool of area codes stored in the area code programming memory 130 during the area code activation process. The particular area code selected will be dictated by a keypad signal $S_{KEY}$ generated by the keypad interfacing circuitry 120 in response to user operation of a corresponding area code selection key 118.

The CPU 126 is coupled to the area code activating memory 132, and is configured for storing the selected area code therein after selection, and recalling it during the phone number dialing process. That is, the area code with which the telephone 100 is currently activated is stored in the area code activating memory 132, and subsequently recalled. The CPU 126 is also coupled to the temporary memory 128 and is configured for storing temporary information, and specifically, an area code during the programming process or the first digit of a local phone number entered by the user during a calling process, as will be described in further detail below. It should be noted that, although the temporary memory 128, area code programming memory 130 and area code activating memory 132 are illustrated as discrete components, they can be conveniently embodied in a single memory device, or even in the CPU 126 itself.

Figure 4:
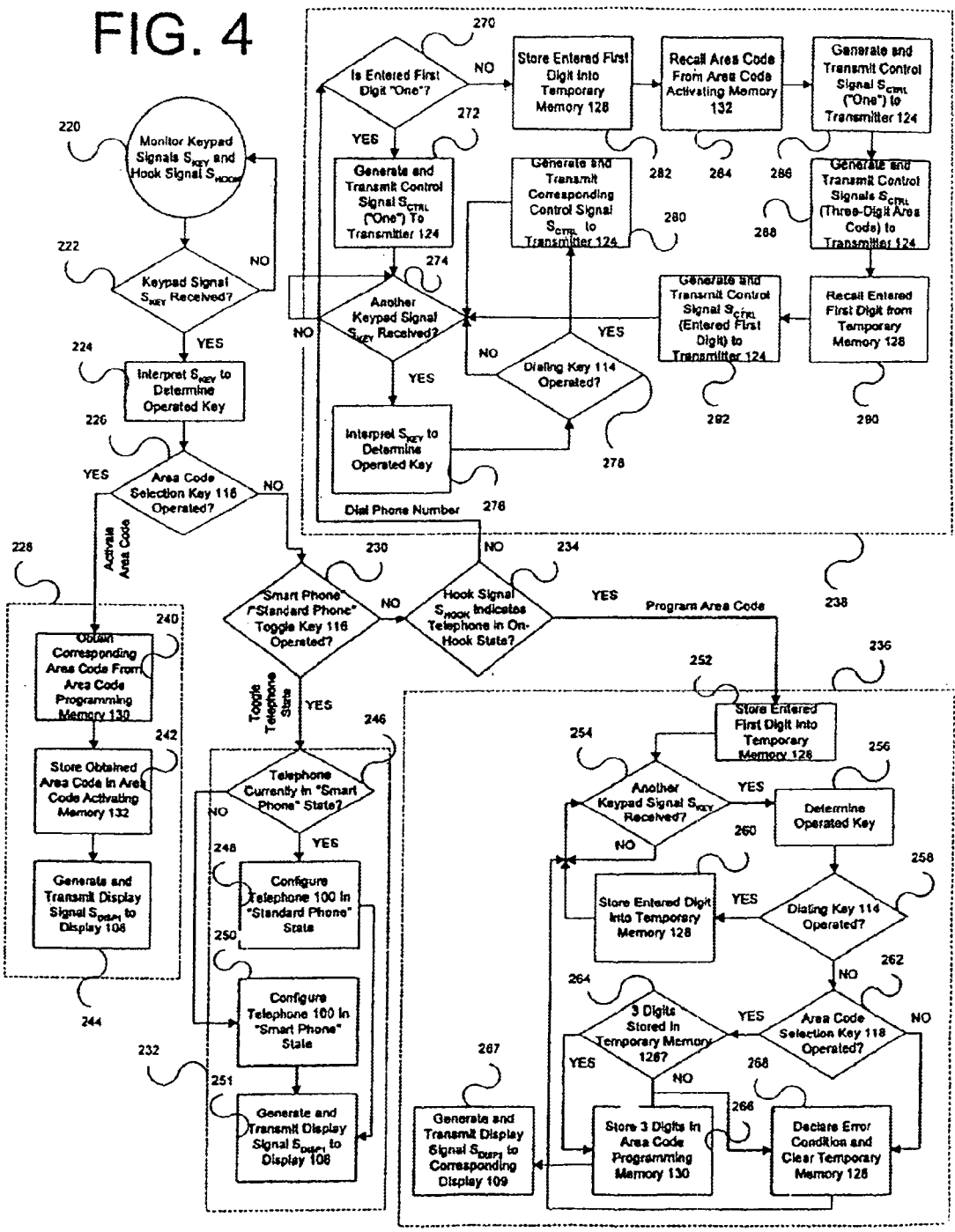
FIG. 4 is a flow diagram illustrating a method used by a central processing unit (CPU) in performing various functions within the circuitry of FIG. 3.

Referring further to FIG. 4, operation of the CPU 126 in effecting the aforementioned "smart phone"/"standard phone" toggling, area code programming, area code activation, and phone number dialing functions, is described. The process begins with the CPU 126 monitoring the keypad signals $S_{KEY}$ and hook signal $S_{HOOK}$ received from the respective keypad interfacing circuitry 120 and hook switch 122 (step 220). The CPU 126 determines if a keypad signal $S_{KEY}$ has been received (step 222). If a keypad signal $S_{KEY}$ is not received from the keypad interfacing circuitry 120, the process returns to step 220, where the keypad signals $S_{KEY}$ and hook signal $S_{HOOK}$ are monitored. If a keypad signal $S_{KEY}$ is received from the keypad interfacing circuitry 120, the CPU 126 interprets the keypad signal $S_{KEY}$ to determine the corresponding key on the keypad 106 that was operated by the user (step 224).

If the keypad signal $S_{KEY}$ indicates that one of the area code selection keys 118 was operated (step 226), the telephone 100 is activated with the corresponding area code at flow process 228. If the keypad signal $S_{KEY}$ indicates that the "smart phone"/"standard phone" toggle key 116 was operated (step 230), the "smart phone"/"standard phone" mode of the telephone 100 is toggled at flow process 232. If the keypad signal $S_{KEY}$ indicates that one of the dialing keys 114 was operated (by default), the CPU 126 determines if the hook signal $S_{HOOK}$ indicates that the telephone 100 is in the off-hook state or on-hook state (step 234). If the hook signal $S_{HOOK}$ indicates that the telephone 100 is in an on-hook state, area code programming of the telephone 100 is initiated at flow process 236. If the hook signal $S_{HOOK}$ indicates that the telephone is in an off-hook state, the phone number dialing of the telephone 100 is initiated at flow process 238.

Turning to the area code activation flow process 228, the CPU 126 obtains the area code that corresponds with the operated area code selection key 118 from the area code programming memory 130 (step 240), and then stores the obtained area code into the area code activating memory 132 (step 242). Preferably, the area code previously stored within the area code activating memory 132 is overwritten with the new area code. The CPU 126 then generates and transmits a display signal $S_{DISP1}$ to the activated area code display 108, thereby exhibiting the newly activated area code to the user (step 244). If the telephone 100 is currently in the "smart phone" mode, the newly activated area code is exhibited to the user, and if the telephone 100 is currently in the "standard phone" mode, the word "OFF" is exhibited to the user.

Turning to the "smart phone"/"standard phone" toggle flow process 232, the CPU 126 determines if the telephone 100 is currently being operated in the "smart phone" mode or the "standard phone" mode (step 246). If it is being operated in the "smart phone" mode, the CPU 126 configures itself to subsequently operate the telephone 100 in the "standard phone" mode (step 248). The CPU 126 then generates and transmits a display signal $S_{DISP1}$ to the activated area code display 108 (step 251), thereby exhibiting the word "OFF" to the user. If it is being operated in the "standard phone" mode, the CPU 126 configures itself to subsequently operate the telephone 100 in the "smart phone" mode (step 250). The CPU 126 then generates and transmits a display signal $S_{DISP1}$ to the activated area code display 108 (step 251), thereby exhibiting the currently activated area code to the user.

Turning to the area code programming flow process 236, the CPU 126 stores the entered first digit, as indicated by the received numerical keypad signal $S_{KEY}$ into the temporary memory 128 (step 252). The CPU 126 then determines if another keypad signal $S_{KEY}$ is received from the keypad interfacing circuitry 120 (step 254). If, after a predetermined time period, another keypad signal $S_{KEY}$ is not received, the process returns to step 254. If another keypad signal $S_{KEY}$ is received, the CPU 126 interprets the keypad signal $S_{KEY}$ to determine the corresponding key on the keypad 106 that was operated by the user (step 256). If the keypad signal $S_{KEY}$ indicates that one of the dialing keys 114 was operated (step 258), the CPU 126 stores the entered digit, as indicated by the received keypad signal $S_{KEY}$, into the temporary memory 128, along with the entered first digit (step 260). The process then returns to step 254, where the CPU 126 receives and interprets another keypad signal $S_{KEY}$.

If the keypad signal $S_{KEY}$ indicates that one of the area code selection keys 118 was operated (step 262), the CPU 126 determines if the temporary memory 128 contains all three digits (i.e., whether a full area code is stored in the temporary memory 128) (step 264). If so, the three digits are stored, and preferably, overwritten in the area code programming memory 130, as an area code (step 266). The CPU 126 then generates and transmits a display signal $S_{DISP2}$ to the corresponding display 109, thereby exhibiting the newly programmed area code to the user (step 267).

If the keypad signal $S_{KEY}$ does not indicate that one of the area code selection keys 118 was operated (step 262), an error condition is declared and the temporary memory 128 is cleared (step 268). An error condition will also be declared if the keypad signal $S_{KEY}$ indicates that a key other than a dialing key 114 or area code selection key 118 was operated. After an error condition is declared, the process returns to step 254, where the CPU 126 receives and interprets still another keypad signal $S_{KEY}$.

Turning to the telephone number dialing flow process 238, the CPU 126 determines if the entered first dig it is a "one" (step 270). If so, the CPU 126 generates and transmits a control signal $S_{CTRL}$ to the DTMF transmitter 124, which results in a DTMF signal representative of the entered first digit (in this case, "one") being transmitted to POTS 110 (step 272). The CPU 126 then determines if another keypad signal $S_{KEY}$ is received (step 274). If another keypad signal $S_{KEY}$ is not received, the process remains at step 274. If another keypad signal $S_{KEY}$ is received, the CPU 126 interprets the keypad signal $S_{KEY}$ to determine the corresponding key on the keypad 106 that was operated by the user (step 276). If a dialing key 114 was not operated (step 278), the CPU 126 ignores the keypad signal $S_{KEY}$ and returns to step 274. If a dialing key 114 was operated, the CPU 126 generates and transmits a control signal $S_{CTRL}$ representative of the entered digit to the DTMF transmitter 124, which results in the transmission of a corresponding DTMF signal to POTS 110 (step 280). This process is repeated at steps 274–280 until the telephone 100 is placed in an on-hook state, effectively terminating communication with POTS 110. Presumably, during this process, a phone call would have been placed by POTS 110. For example, if the dialed phone number contains a single-digit long distance access number, a phone call will be placed after ten digits are entered into the keypad 106, and ten corresponding DTMF signals are generated and transmitted to POTS 110 at steps 274–280. If the dialed phone number contains a multi-digit long distance access number, a phone call will be placed after seventeen digits, e.g., are entered into the keypad 106, and seventeen corresponding DTMF signals are transmitted to POTS 110 at steps 274–280.

If, at step 270, the entered first digit is not a "one," the CPU 126 stores it into the temporary memory 128 (step 282), and recalls the area code from the area code activating memory 132 (step 284). The CPU 126 then generates and transmits a control signal $S_{CTRL}$ representative of a single digit long distance access number (in this case, the digit "one") to the DTMF transmitter 124 (step 286), which results in the transmission of a corresponding DTMF signal to POTS 110. The CPU 126 then generates and transmits control signals $S_{CTRL}$ representative of the three-digit recalled area code to the DTMF transmitter 124, which results in the transmission of a number of corresponding DTMF signals (in this case, three) to POTS 110 (step 288). The CPU 126 then recalls the entered first digit from the temporary memory 128 (step 290), and generates and transmits a control signal $S_{CTRL}$ representative of the entered first digit to the DTMF transmitter 124 (step 292), which results in the transmission of a corresponding DTMF signal to POTS 110. The CPU 126 then goes to steps 274–280, where the entered digits are handled by the CPU 126 in the same manner as the entered digits are handled if the first entered digit would have been a "one." Presumably, during this process, a phone call would have been placed by POTS 110. For example, a phone call would be placed when the six remaining digits of the local phone number are entered into the keypad 106, and six corresponding DTMF signals are generated and transmitted to POTS 110 at steps 274–280.

Figure 5:
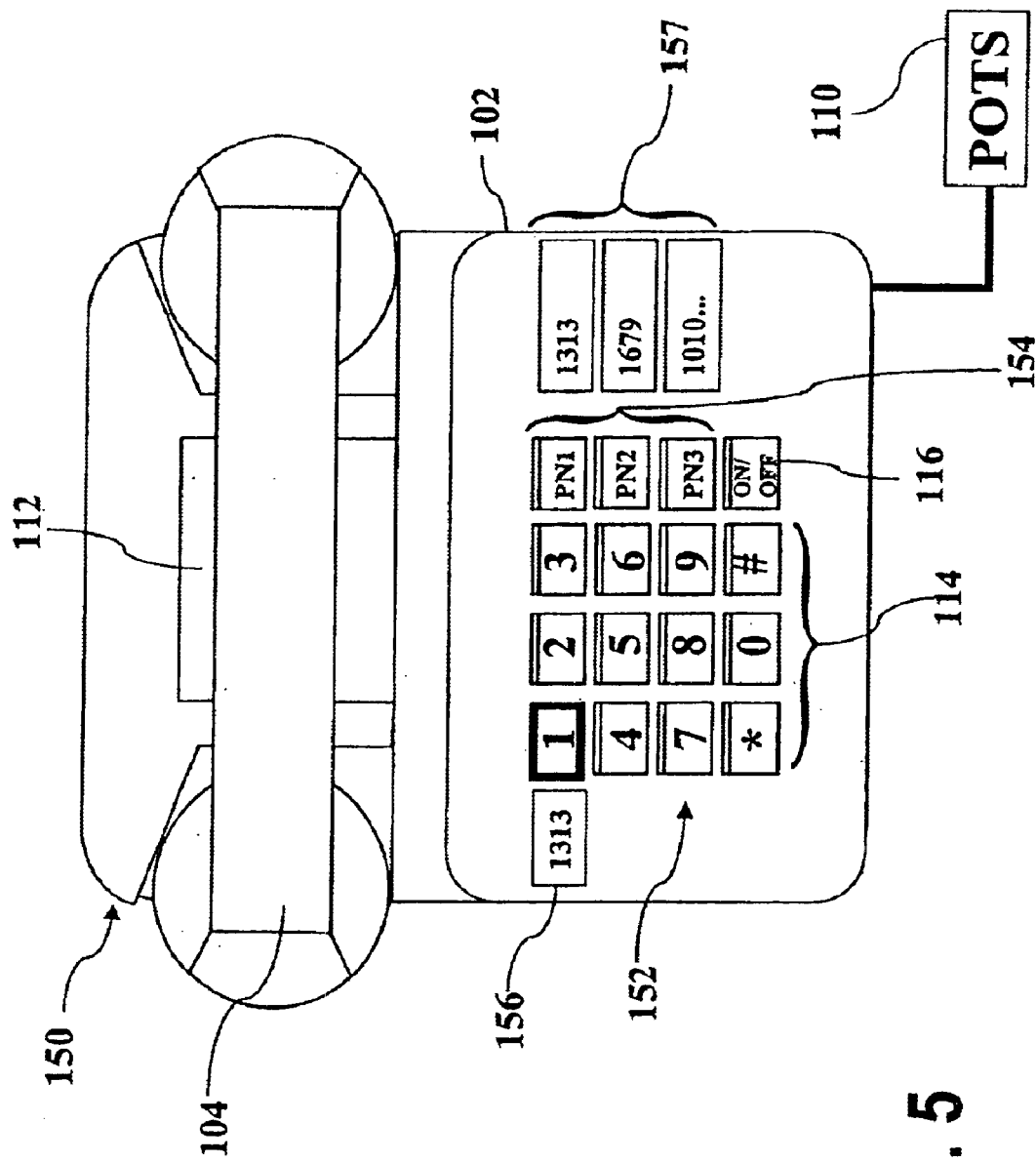
FIG. 5 is a plan view of a preferred automatic preceding number dialing telephone constructed in accordance with the present inventions.

Referring to FIG. 5, an automatic preceding number dialing telephone 150 constructed in accordance with the present inventions is described. The telephone 150 is similar to the telephone 100 described above in that it efficiently eliminates keystrokes required to dial a telephone number under certain circumstances. To the extent that both telephones 100 and 150 comprise similar components, identical reference numbers have been used.

The telephone 150 differs from the telephone 100 in that it is configured to allow the user the flexibility to activate the telephone 150 with any preceding number. Thus, when in the "smart phone" mode, the telephone 150 automatically dials the preceding number with which the telephone 150 is activated in response to an entered "one." To this end, the telephone 150 comprises a keypad 152 that includes a plurality of preceding number selection keys 154 (in this case, three), which allows a user to flexibly activate the telephone 150 with a selected one of a plurality of corresponding preceding numbers programmed into the telephone 150.

By way of non-limiting example, the activated preceding number may simply contain an area code, a long distance access number, or the combination of a long distance access number and an area code. The long distance access number may include the single digit "one" (as in the illustrated embodiment) or a multitude digit number, e.g., "10-10-321-1". In the latter case, the long distance phone number contains eighteen digits, and thus, eleven keystrokes (corresponding to the eight-digit long distance access number and three-digit area code) are eliminated when dialing a long distance number. Along with the advantages that are associated with implementing the telephone 150 in an area code overlay region, particular advantages are obtained when the user desires to frequently call a specific region long distance using a multi-digit long distance access number.

The telephone 150 further comprises an activated preceding number display 156, which exhibits the preceding number (in this case, "1313") with which the telephone 150 is currently activated, and programmed preceding number displays 157 (in this case, "1313," "1679", and "1010 . . . " (signifying "10103211212")), which respectively exhibit the preceding numbers with which the telephone 150 is currently programmed.

In order to make full use of the telephone 150 within an area code overlay region, two of the preceding numbers programmed into the telephone 150 preferably contain a "one" and the base area code, and a preceding "one" and the overlaying area code. Also, the remaining preceding number programmed into the telephone 150 may contain a multi-digit long distance access number (if the user typically uses a multi-digit access number when making a long distance phone call) and an area code that is most often used to make a long distance phone call. As with the telephone 100 described above, this may be advantageous when the user, e.g., makes a series of calls to a particular area code unrelated to the area code overlay region, in which case, the telephone 150 can be activated with the preceding number containing the corresponding area code, if such area code is one of the three area codes programmed into the telephone 150. The telephone 150 can then be activated with one of the other two programmed area codes when the user is finished making the series of calls.

Alternatively, the remaining preceding number may contain only the multi-digit long distance access number without the area code. In this case, the user may make a long distance phone call to any area code by dialing this area code and the local phone number. Thus, the user dials ten digits, but need not dial the multi-digit long distance access number, potentially saving eight key strokes if the long distance access number is "10-10-321-1". The dialing methodology works in this case, because no area code has a "one" as its first digit. Thus, when the first digit of the area code is entered by the user, the telephone 150 automatically recalls and dials the stored multi-digit access number.

As with the telephone 100, there is preferably some identifying feature on the telephone 150 that indicates to a user that the telephone 150 is a "smart phone" that allows the user to place a local phone call from an area code overlay region, or otherwise place a long distance phone call to a frequently called region, without having to dial a long distance phone number. For example, in the illustrated embodiment, the color of the "one" dialing key 114 is darker than the remaining dialing keys 114. The programming of the preceding numbers into the telephone 150 can be accomplished by the user in a similar manner described above with respect to the programming of area codes into the telephone 100. Once the preceding numbers are programmed into the telephone 150, the telephone 150 can be activated with the desired preceding number by selecting one of the programmed preceding numbers. That is, the user depresses the number selection key 154 corresponding with the desired preceding number with which the telephone 150 is to be activated.

Figure 6:
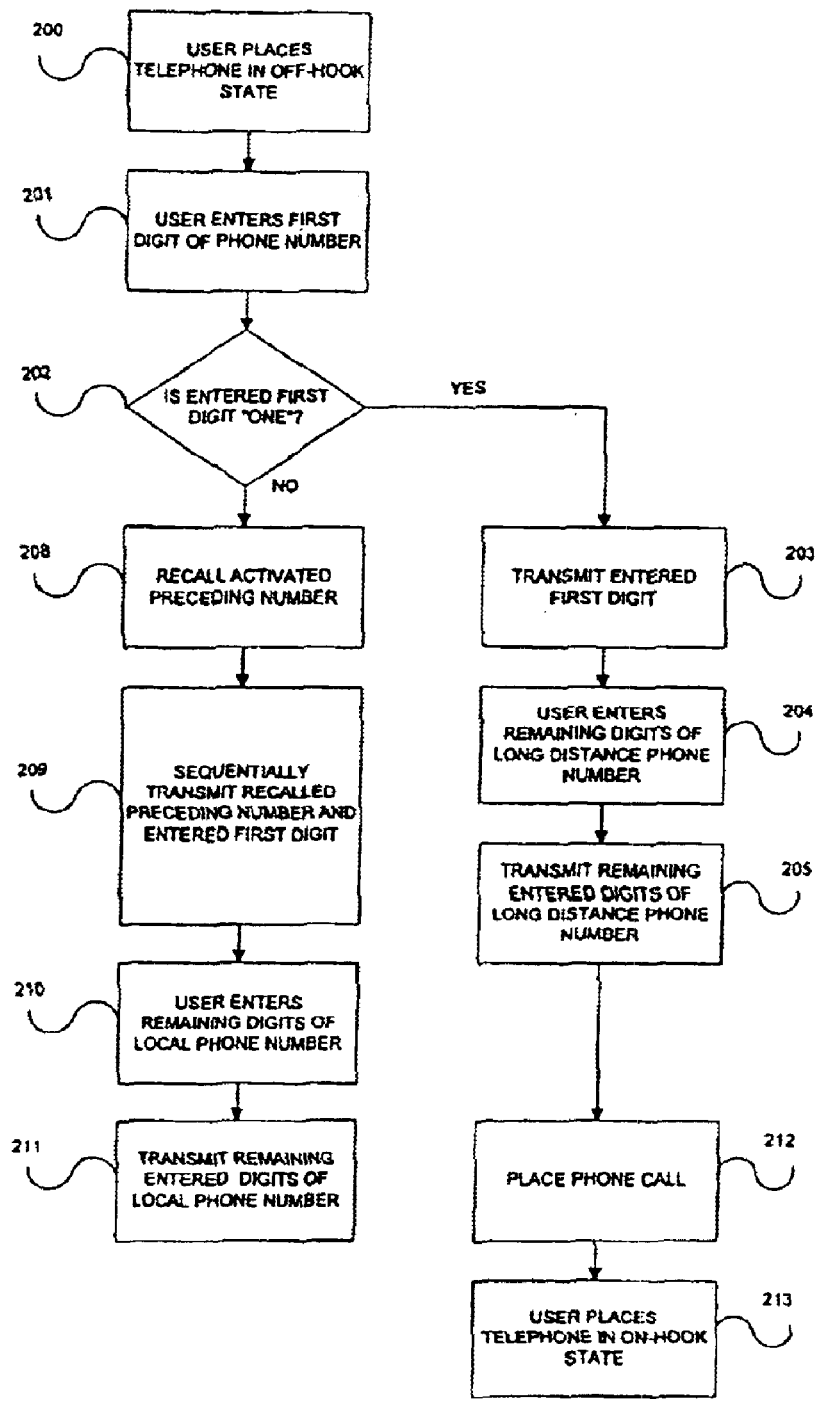
FIG. 6 is a flow diagram illustrating a method used to dial a phone number with the telephone of FIG. 5.

With further reference to FIG. 6, a method for calling a phone number from the telephone 150 is performed in accordance with the present inventions. It is presumed that, at this point, the telephone 150 has been activated with a number, and in the telephone illustrated in FIG. 5, with the number "1313." The method illustrated in FIG. 6 is similar to the method illustrated in FIG. 2, with the exception that a preceding number contains a long distance access number, as well as an area code, that is automatically dialed from the telephone 150. To the extent that the steps performed in the method of FIG. 6 are similar to those performed in the method of FIG. 2, identical reference numbers have been assigned.

In this regard, the user, after removing the handset 104 from the cradle 112, enters the first digit of the phone number, and the telephone 1.50 determines if the entered first digit is a "one" (steps 200–202). If the entered first digit is a "one," it is assumed the phone number entered by the user will be a long distance phone number, in which case, the telephone 150 dials the entered long distance phone number (steps 203–205). If the entered first digit is not a "one," it is assumed that the phone number entered by the user will be a local phone number, in which case, the telephone 150 recalls the activated preceding number (step 208), and then sequentially transmits the recalled preceding number and the entered first digit to POTS 110 (step 209). The user then enters the remaining digits of the local phone number, and the telephone 150 transmits them to POTS 110 (steps 210 and 211). The user places the telephone 150 in the on-hook state (steps 212 and 213).

Figure 7:
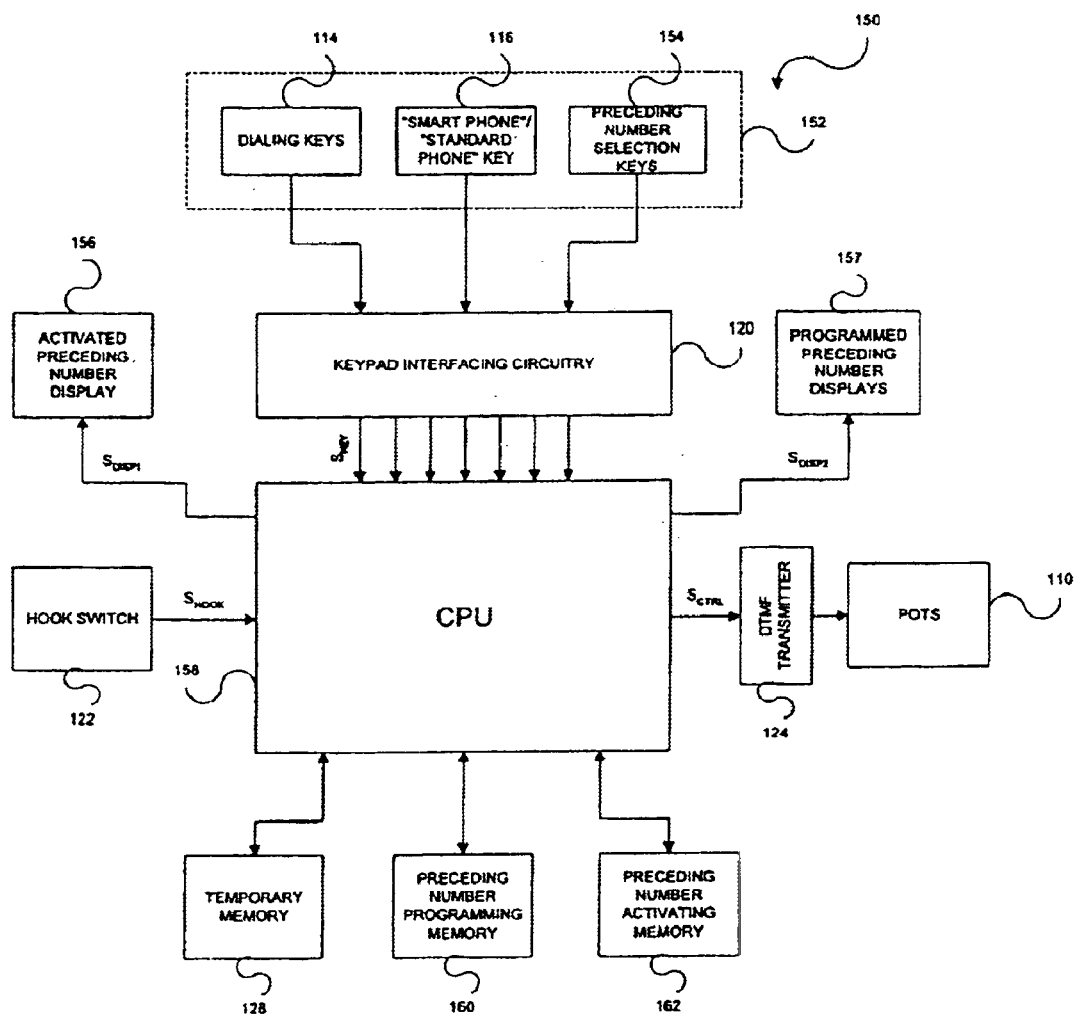
FIG. 7 is a block diagram of the circuitry implemented in the telephone of FIG. 5.

With reference to FIG. 7, the telephone circuitry used to implement the programming and dialing functions described above is described. The circuitry of the telephone 150 is similar to that of the telephone 100, with the exception that the circuitry of the telephone 150 is configured to automatically dial a preceding number with which the telephone 150 is activated, whether the number be an area code, a combination of a long distance access number and area code, or otherwise. To the extent that the telephone circuitry components illustrated in FIG. 7 are similar to those illustrated in FIG. 3, identical reference numbers have been assigned. As illustrated, the components of the telephone 150 differ from that of the telephone 100 in that keypad 106, area code selection keys 118, activated area code display 108, programmed area code displays 109, CPU 126, area code programming memory 130, and area code activating memory 132 have been respectively replaced with the keypad 152, preceding number selection keys 154, activated preceding number display 156, programmed preceding number displays 157, CPU 158, preceding number programming memory 160, and preceding number activating memory 162.

The CPU 158 is coupled to the preceding number programming memory 160 and is configured for storing a pool of numbers therein during the programming process. The particular pool of preceding numbers stored within the memory 160 will be dictated by keypad signals $S_{KEY}$ generated by the keypad interfacing circuitry 120 in response to user operation of the keypad 152. The CPU 158 is configured for selecting one of the pool of preceding numbers stored in the memory 160 during the activation process. The particular preceding number selected will be dictated by a keypad signal $S_{KEY}$ generated by the keypad interfacing circuitry 120 in response to user operation of a corresponding preceding number selection key 154.

The CPU 158 is coupled to the preceding number activating memory 162, and is configured for storing the selected preceding number therein after selection, and recalling it during the phone number dialing process. That is, the preceding number with which the telephone 150 is currently activated is stored in the memory 162, and subsequently recalled. The CPU 158 is also coupled to the temporary memory 128 and is configured for storing temporary information, and specifically, a preceding number during the programming process or the first digit of a local phone number entered by the user during a calling process, as will be described in further detail below. The CPU 158 is coupled to the activated preceding number display 156, and is configured for generating and transmitting a display signal $S_{DISP1}$ for prompting the display 156 to exhibit the activated preceding number to the user. The CPU 158 is also coupled to the programmed preceding number displays 157, and is configured for generating and transmitting display signals $S_{DISP2}$ for prompting the displays 157 to respectively exhibit the programmed preceding numbers.

Figure 8:
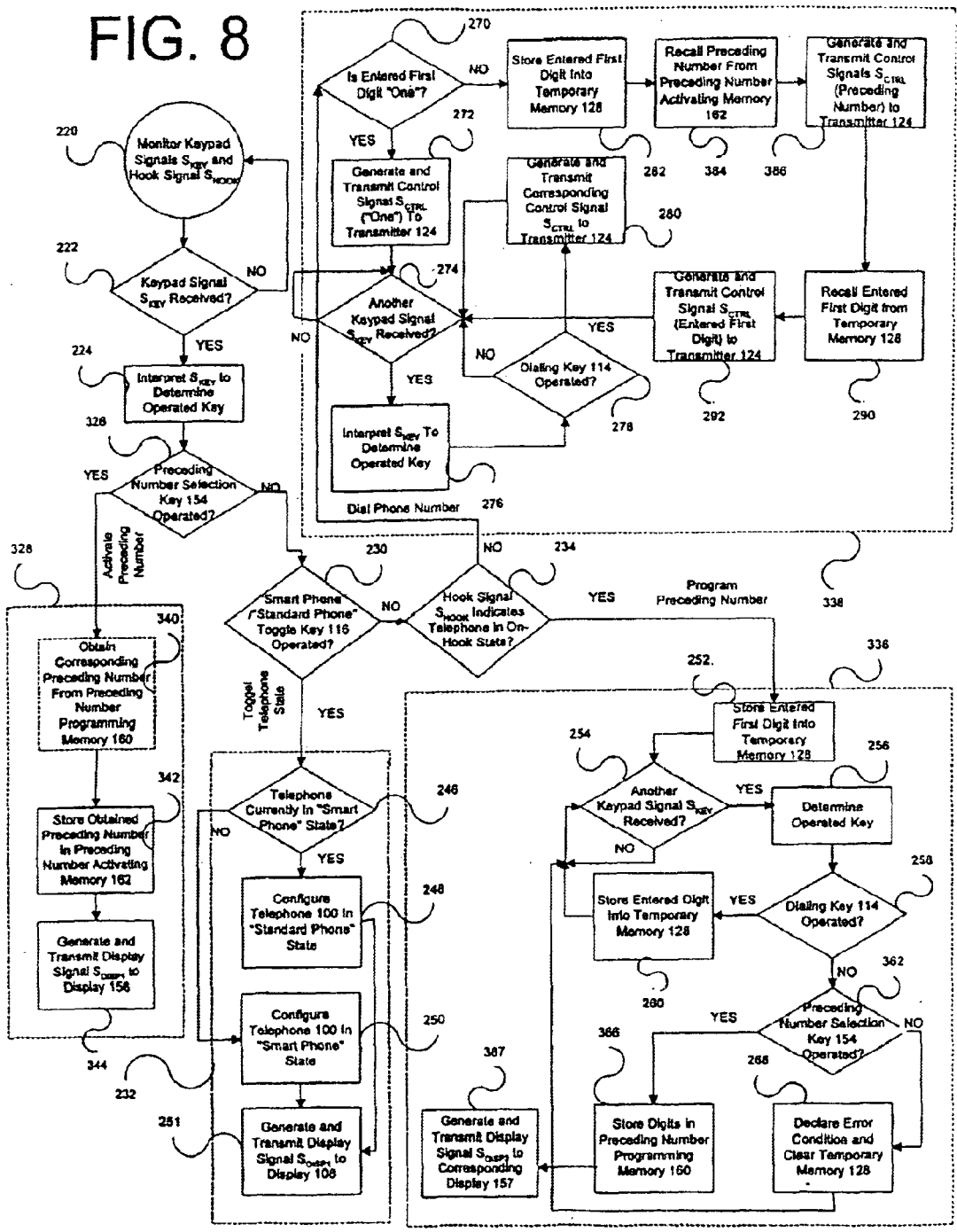
FIG. 8 is a flow diagram illustrating a method used by a central processing unit (CPU) in performing various functions within the circuitry of FIG. 7.

Referring further to FIG. 8, operation of the CPU 158 in effecting the aforementioned "smart phone"/"standard phone", preceding number programming, preceding number activation, and phone number dialing functions, is described. The method illustrated in FIG. 8 differs from that illustrated in FIG. 4 in that the CPU 158 effects activation and programming of preceding numbers that are not limited to area codes. To this end, the area code activation flow process 228, area code programming flow process 236, and phone number dialing process 238 have been respectively replaced with a preceding number activation flow process 328, preceding number programming flow process 336, and phone number dialing process 338. To the extent that the steps performed in the method of FIG. 8 are similar to those performed in the method of FIG. 4, identical reference numbers have been assigned.

The CPU 158 performs the preceding number activation flow process 328 in the same manner as the CPU 126 performs the area code activation flow process 228, with the exception that the telephone 150 is activated with a preceding number. Specifically, the CPU 158 performs the preceding number activation flow process 328 if the preceding number selection key 154 is operated (step 326). Within this process, the CPU 158 obtains the preceding number that corresponds with the operated preceding number selection key 154 from the memory 160 (step 340), and stores the obtained preceding number into the memory 162 (step 342). Preferably, the preceding number previously stored within the memory 162 is overwritten with the new preceding number. The CPU 158 then generates and transmits a display signal $S_{DISP1}$ to the activated preceding number display 156, thereby exhibiting the newly activated preceding number to the user (step 344). If the telephone 150 is currently in the "smart phone" mode, the newly activated preceding number is exhibited to the user, and if the telephone 150 is currently in the "standard phone" mode, the word "OFF" is exhibited to the user.

The CPU 158 performs the preceding number programming flow process 336 in the same manner as the CPU 126 performs the area code programming flow process 236, with the exception that the telephone 150 is programmed with a preceding number that is not limited to a three-digit number. Specifically, the first digit is entered via operation of the dialing keys 114 and stored in the temporary memory 128 (steps 252–260). If the next keypad signal $S_{KEY}$ indicates that one of the preceding number selection keys 154 was operated (step 362), the digits are obtained from the temporary memory 128 and stored, and preferably overwritten, in the memory 160 (step 366). It is noted that, because any number of digits can be stored in the memory 160, the CPU 158 does not determine the number of digits stored in the temporary memory 128, and thus, step 264 (shown in FIG. 4) is not required. The CPU 158 then generates and transmits a display signal $S_{DISP2}$ to the corresponding display 157, thereby exhibiting the newly programmed preceding number to the user (step 367). If the next keypad signal $S_{KEY}$ does not indicate that one of the preceding number selection keys 154 was operated (step 362), an error condition is declared (step 268).

The CPU 158 performs the phone number dialing flow process 338 in the same manner as the CPU 126 performs the phone number dialing flow process 238, with the exception that a preceding number that is not limited to the area code is dialed from the telephone 150. To this end, the CPU 158 determines if the entered first digit is a "one," and if so, dials the digits of the phone number as they are entered in by the user (steps 270–280). If the entered first digit is not a "one," the CPU 158 stores the first entered digit (step 282). The CPU 158 then recalls the preceding number from the memory 162 (step 384), and generates and transmits control signals $S_{CTRL}$ representative of the preceding number to the DTMF transmitter 124 (step 386). The CPU 158 then dials the entered first digit at steps 290 and 292, and dials the remaining digits (steps 274–280).

Figure 9:
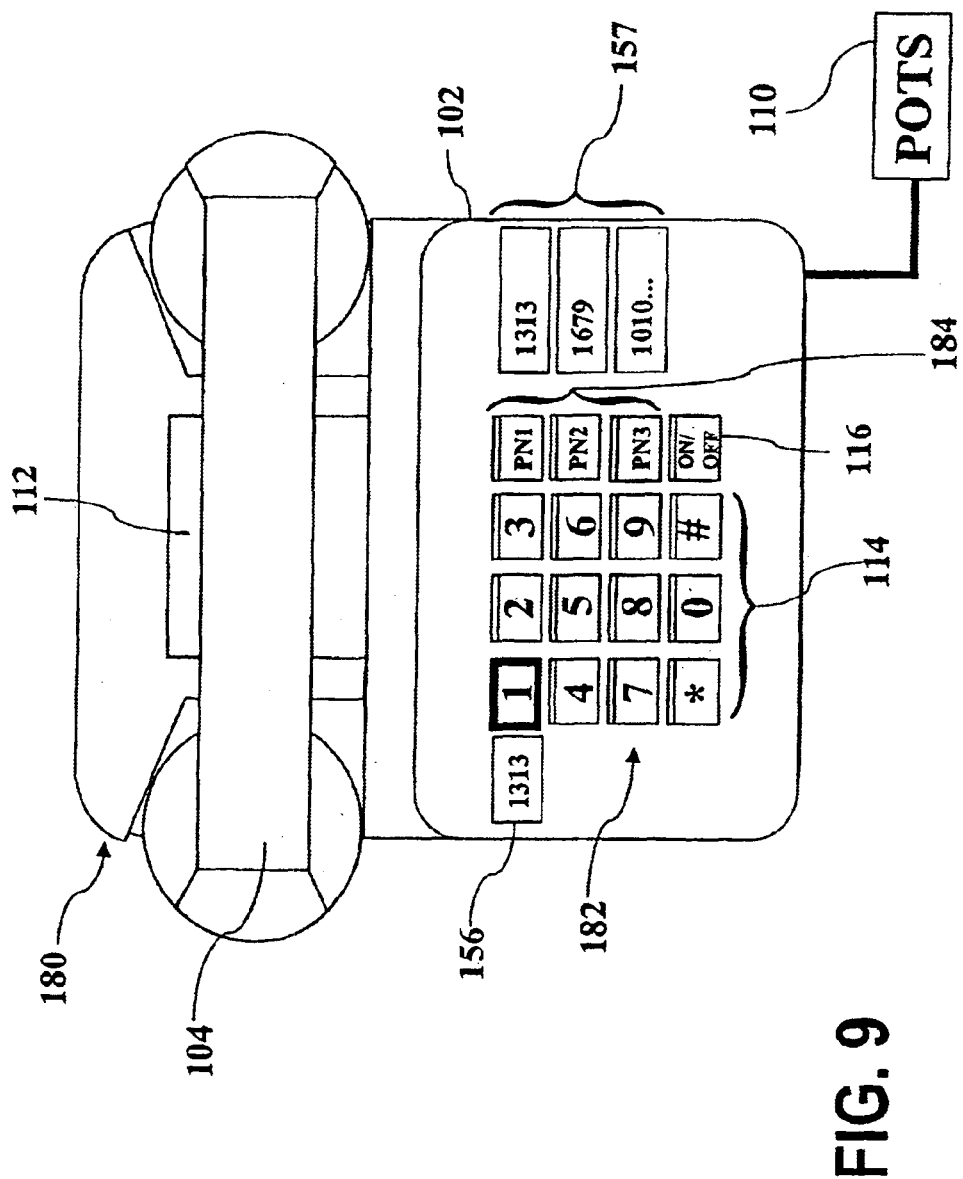
FIG. 9 is a plan view of an alternative preferred automatic preceding number dialing telephone constructed in accordance with the present inventions.

Referring to FIG. 9, another automatic preceding number dialing telephone 180 constructed in accordance with the present inventions is described. The telephone 180 is similar to the telephone 150 described above in that it efficiently eliminates keystrokes required to dial a telephone number under certain circumstances. To the extent that both telephones 150 and 180 comprise similar components, identical reference numbers have been used. The telephone 180 differs from the telephone 150 in that it is configured to optionally allow the user to automatically dial the preceding number upon operation of a dedicated function key.

To this end, the telephone 180 comprises a keypad 182 that includes a plurality of preceding number selection keys 184 (in this case, three), which not only allows a user to flexibly activate the telephone 180 with a selected one of a plurality of corresponding preceding numbers programmed into the telephone 180, as described above with respect to the telephone 150, but also allows a user to automatically dial a preceding number corresponding to one of the operated preceding number selection keys 184. Thus, the telephone 180 may advantageously reduce the number of keystrokes required to make a local phone call within an area code overlay region by programming the telephone 180 with preceding numbers respectively containing the base area code and overlaying area code of the area code overlay region, as described above, in which case, the other programmed preceding number can contain a multi-digit long distance access number or the combination of the multi-digit long distance access number and frequently called area code when making long distance phone calls.

Optionally, the telephone 180 may advantageously reduce the number of keystrokes required to make a long distance phone call between two geographically split area code regions. That is, if the telephone 180 is installed within a region in which a geographical area code split has been implemented, the telephone 180 can be programmed with a preceding number containing the area code corresponding to the split area code region in which the telephone 180 is not installed. For example, the telephone 180 may be programmed with the preceding number "1714," if the telephone 180 previously was installed in the "714" area code region, but is now installed in the "949" area code region by virtue of a geographical area code split. In this case, the user can conveniently operate the preceding number selection key 184 corresponding to the "1714" preceding number. The other two programmed preceding numbers can respectively contain two other frequently called area codes used to call long distance. Thus, it can be seen that the user can flexibly program the telephone 180 with preceding numbers depending upon whether the telephone 180 is installed in an area code overlay region or a geographically split area code region.

Figure 10:
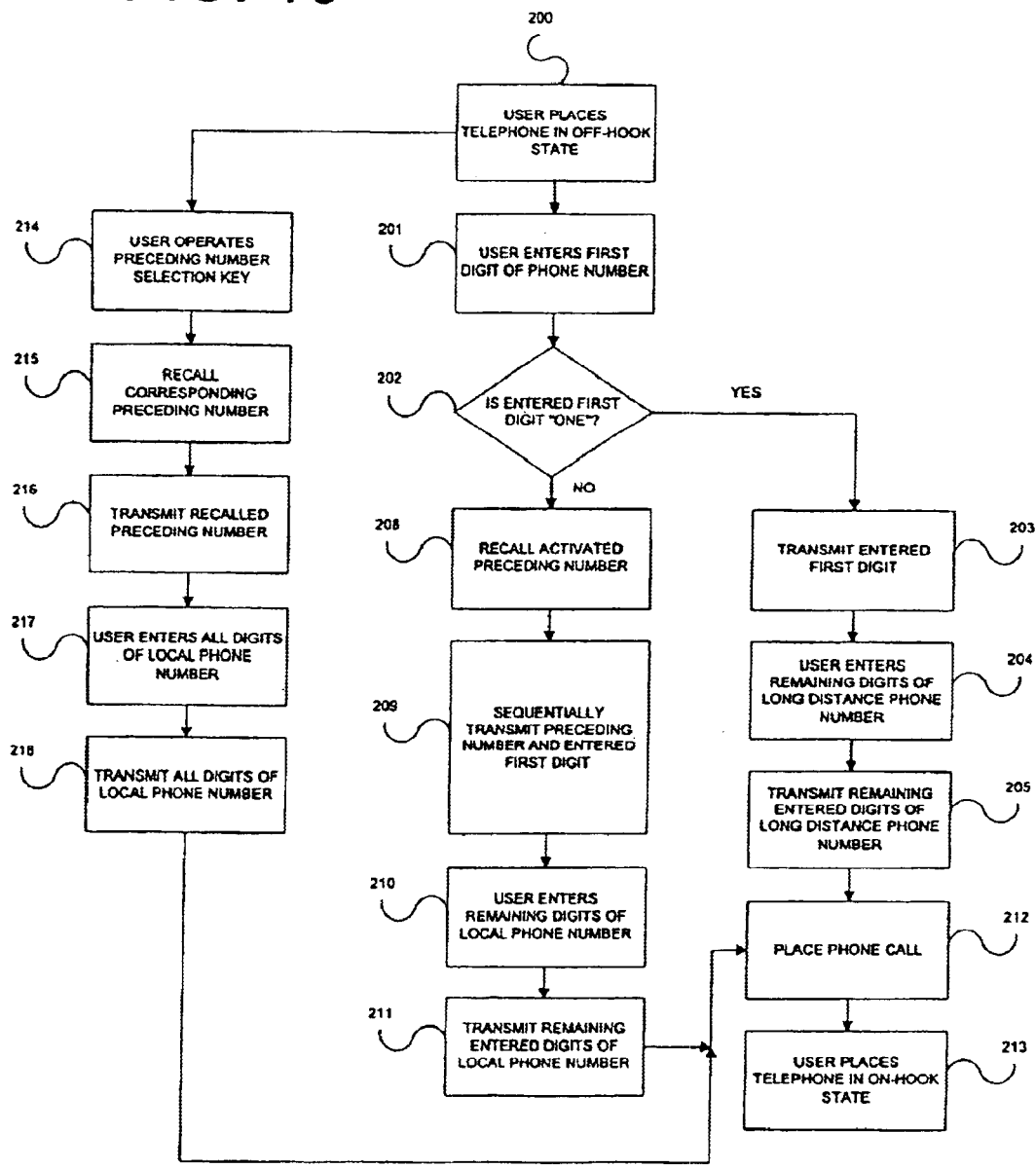
FIG. 10 is a flow diagram illustrating a method used to dial a phone number with the telephone of FIG. 9.

With further reference to FIG. 10, a method for calling a phone number from the telephone 180 is performed in accordance with the present inventions. It is presumed that, at this point, the telephone 180 has been activated with a number, and in the telephone illustrated in FIG. 9, with the number "1313." The method illustrated in FIG. 10 is similar to the method illustrated in FIG. 6, with the exception that the telephone 180 automatically dials a preceding number with which the telephone 150 is activated in response to user operation of a corresponding preceding number selection key 184, as well as user entry of the first digit "one." To the extent that the steps performed in the method of FIG. 10 are similar to those performed in the method of FIG. 6, identical reference numbers have been assigned.

In this regard, if the user places the telephone 180 in an off-hook state and enters a first digit of a phone number without operating one of the preceding number selection keys 184 (steps 200 and 201), the telephone 180 dials the phone number as hereinbefore described (step 202–205 and 208–211). If, however, the user places the telephone 180 in an off-hook state and operates one of the preceding number selection keys 184 (steps 200 and 214), the telephone 180 recalls the corresponding preceding number (step 215), and then transmits the recalled preceding number to POTS 110 (step 216). The user then enters all of the digits of the local phone number (step 217), and the telephone 180 transmits these digits to POTS 110 (step 218). Whether the phone call is dialed in response to entry of a first digit of a phone number (step 201) or operation of the preceding number selection key 184 (step 214), the phone call is placed and, once completed, the user places the telephone 180 in the on-hook state (steps 212 and 213).

Figure 11:
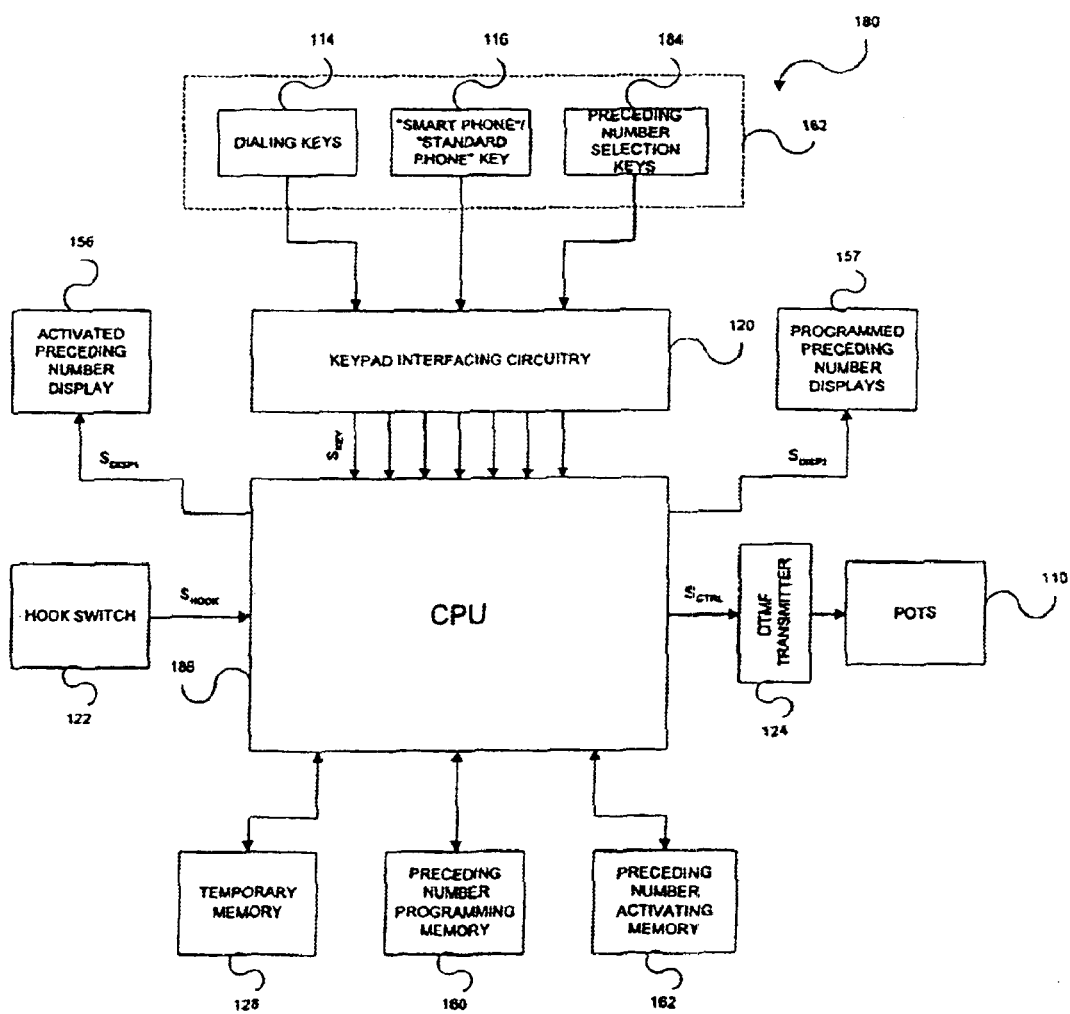
FIG. 11 is a block diagram of the circuitry implemented in the telephone of FIG. 9.

With reference to FIG. 11, the telephone circuitry used to implement the programming and dialing functions described above is described. The circuitry of the telephone 180 is similar to that of the telephone 150, with the exception that the circuitry of the telephone 180 is configured to also automatically dial a preceding number if the user operates a preceding number selection key 184. To the extent that the telephone circuitry components illustrated in FIG. 11 are similar to those illustrated in FIG. 7, identical reference numbers have been assigned. As illustrated, the components of the telephone 180 differ from that of the telephone 150 in that the CPU 158 has been replaced with a CPU 186. The CPU 186 is configured and coupled to the preceding number programming memory 160, preceding number activating memory 162, temporary memory 128, and displays 156 and 157 in a manner similar to that described with respect to the CPU 158. The CPU 186, however, is further configured to recall one of the pool of preceding numbers stored in the memory 160 during the phone number dialing process. The particular preceding number selected will be dictated by a keypad signal $S_{KEY}$ generated by the keypad interfacing circuitry 120 in response to user operation of a corresponding preceding number selection key 184.

Figure 12A:
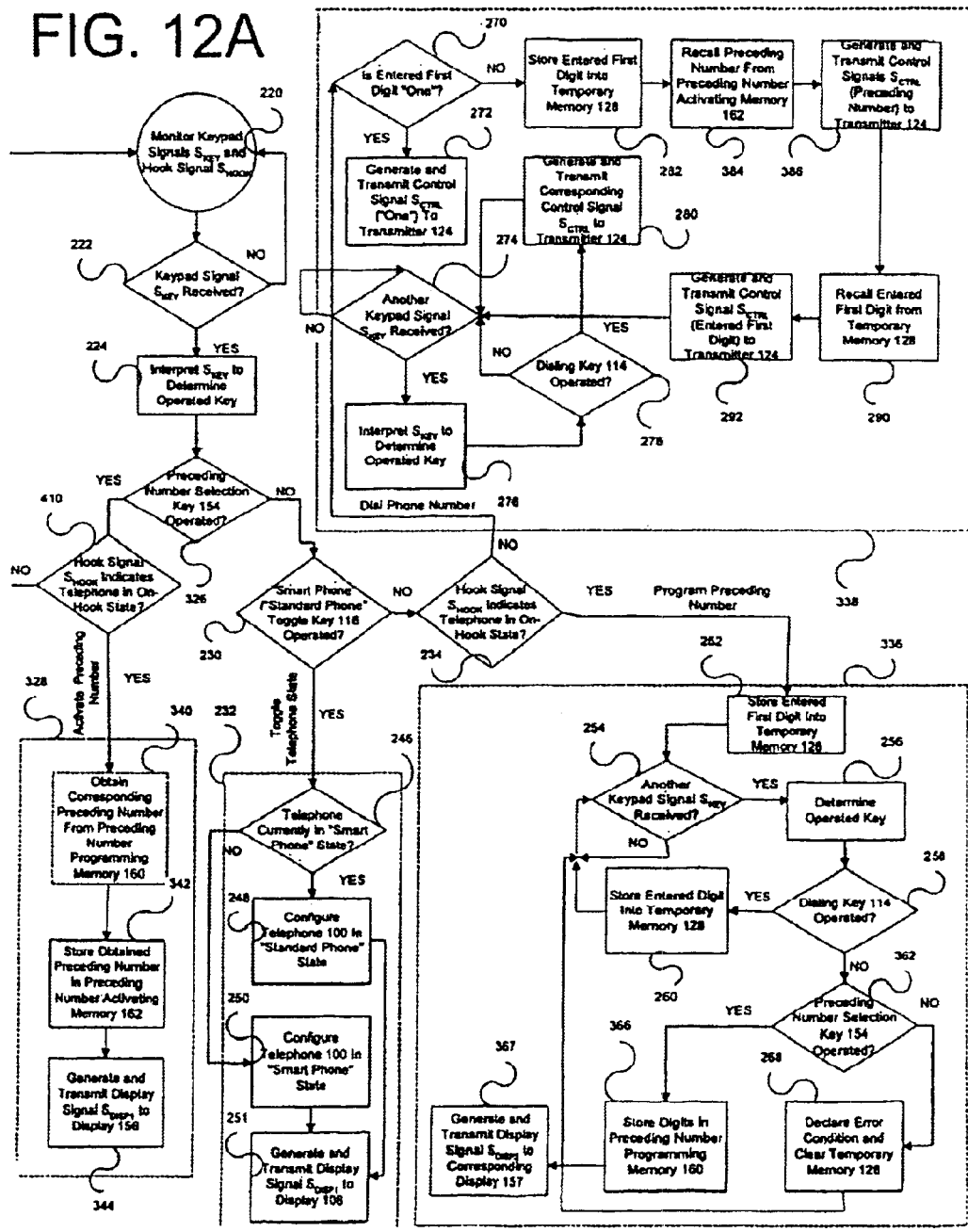
FIG. 12 is a flow diagram illustrating a method used by a central processing unit (CPU) in performing various functions within the circuitry of FIG. 11.
Figure 12B:
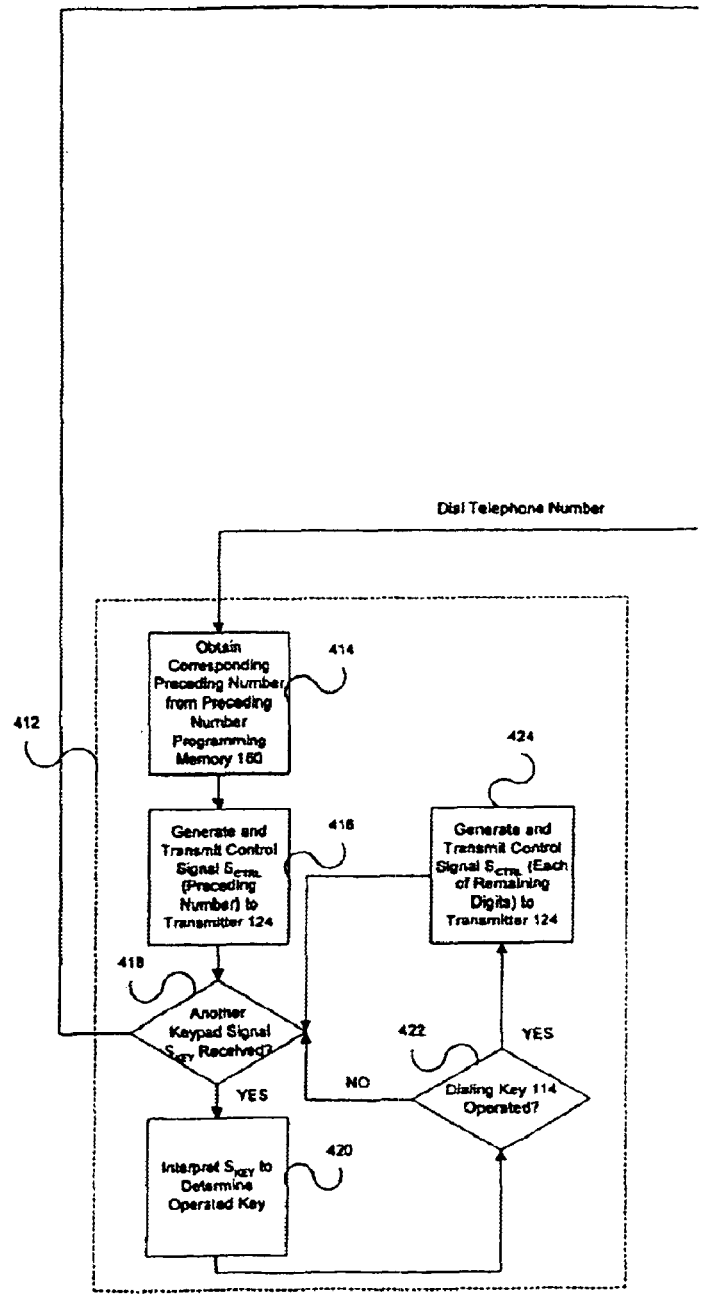

Referring further to FIG. 12, operation of the CPU 186 in effecting the aforementioned "smart phone"/"standard phone", preceding number programming, preceding number activation, and phone number dialing functions is described. The method illustrated in FIG. 12 differs from that illustrated in FIG. 8 in that it further includes another phone number dialing process 412 that is initiated by the operation of one of the preceding number selection keys 184. To the extent that the steps performed in the method of FIG. 12 are similar to those performed in the method of FIG. 8, identical reference numbers have been assigned. To the extent that the steps performed in the method of FIG. 12 are similar to those performed in the method of FIG. 8, identical reference numbers have been assigned.

Because the preceding number activation flow process 328 is also initiated by operation of one of the preceding number selection keys 154, the CPU 186 selects the proper flow process based on the on-hook state of the telephone 180, i.e., the status of the hook signal $S_{HOOK}$. Specifically, if the preceding number selection key 154 is operated (step 326), and the hook signal $S_{HOOK}$ indicates that the telephone 180 is in the on-hook state (step 410), the CPU 186 performs the preceding number activation flow process 328. If the hook signal SHOOK indicates that the telephone 180 is in the off-hook state (step 410), the CPU 186 performs the phone number dialing flow process 412.

Turning to the phone number dialing flow process 412, the CPU 186 obtains the preceding number that corresponds with the operated preceding number selection key 154 from the preceding number programming memory 160 (step 414), and then generates and transmits control signals $S_{CTRL}$ representative of the preceding number to the DTMF transmitter 124 (step 416). The CPU 186 then determines if another keypad signal $S_{KEY}$ is received (step 418). If another keypad signal $S_{KEY}$ is not received within a predetermined period of time, communication between the telephone 180 and POTS 110 terminates, in which case, the process returns to step 220 after the telephone 180 is placed into an on-hook state. If another keypad signal $S_{KEY}$ is received, the CPU 186 interprets the keypad signal $S_{KEY}$ to determine the corresponding key on the keypad 182 that was operated by the user (step 420). If a dialing key 114 was not operated (step 422), the CPU 186 ignores the keypad signal $S_{KEY}$ and returns to step 418. If a dialing key 114 was operated, the CPU 186 generates and transmits a control signal $S_{CTRL}$ representative of the entered digit to the DTMF transmitter 124 (step 424). This process is repeated at steps 418–424 until all seven digits within the local phone number have been entered through the keypad 182.

Figure 13:
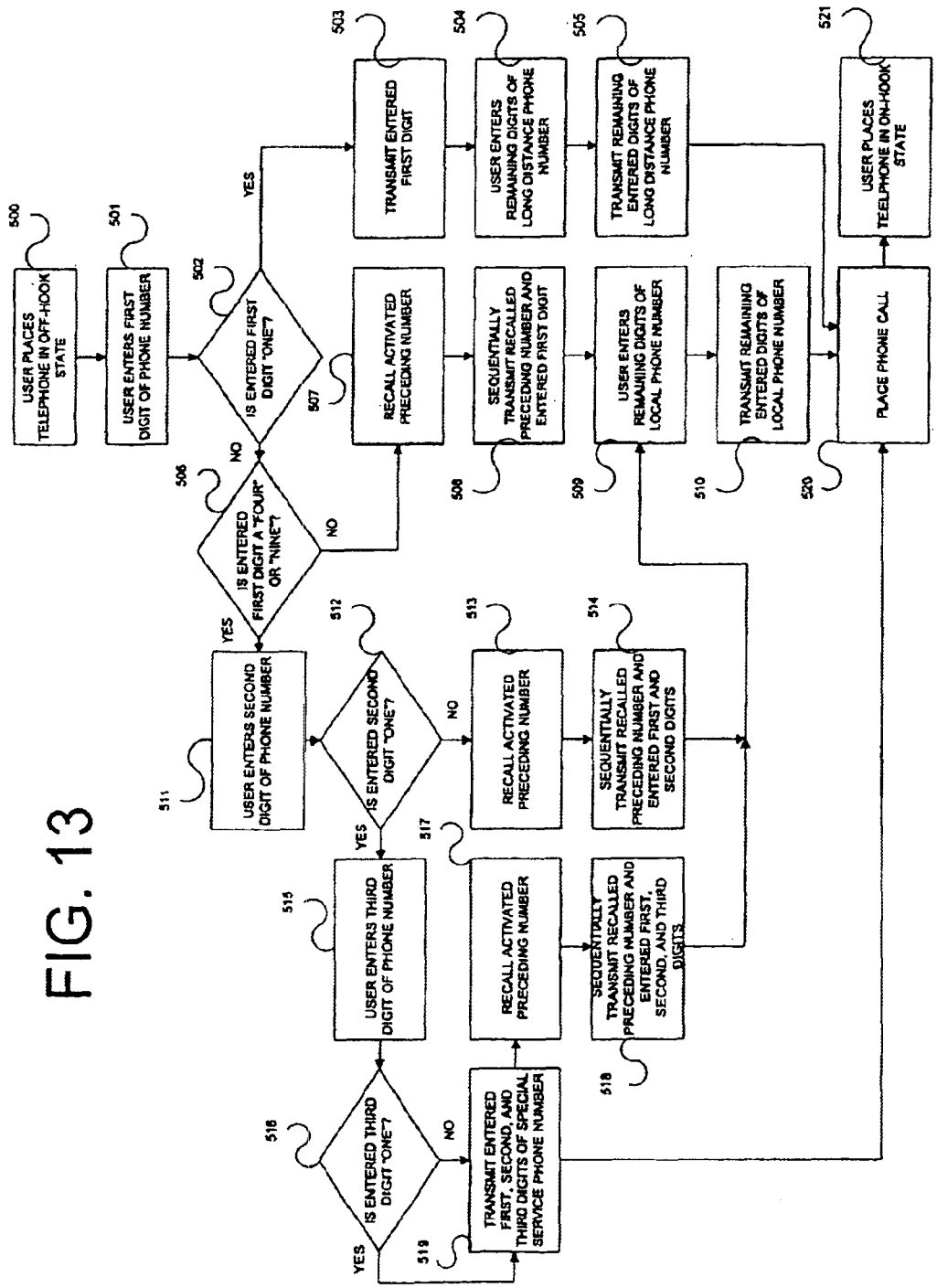
FIG. 13 is a flow diagram illustrating an alternative method used to dial a phone number with the telephone of FIG. 5.

As briefly discussed above, the user is required to operate the "smart phone"/"standard phone" toggle key 116 to place the respective telephones 100, 150, and 180 into a "standard phone" mode when dialing special service numbers. FIG. 13 illustrates a methodology that can be implemented into the telephone 150, such that placement of the telephone 150 in the "standard phone" mode is an unnecessary precedent to dialing these special service numbers. This methodology is similar to that described in FIG. 6 in that the telephone 150 distinguishes whether the user desires to make a local phone call or a long distance phone call, and accordingly dials a corresponding phone number. It differs from that described in FIG. 6, however, in that the telephone 150 analyzes the initial digits of the entered phone number to determine the nature of the phone number, and specifically, whether the phone number is a long distance phone number, local phone number, or special service phone number. If the special service phone number is assumed to be a maximum of three digits long, the initial digits analyzed may range from one to three digits.

Any special service number can be programmed into the telephone 150 by the manufacturer or user using suitable means, such that the telephone 150 determines when this special service number has been entered by the user. For the purposes of brevity, the methodology illustrated in FIG. 6 assumes that only the more commonly used special service numbers "411" and "911" are programmed into the telephone 150.

Specifically, the user removes the handset 104 from the cradle 112 to place the telephone 150 in the off-hook state (step 500), thereby establishing communication with POTS 110. Upon establishing communication with POTS 110, i.e., when an audible dial tone is heard, the user initiates the calling process by entering the first digit of the phone number into the keypad 106 (step 501). The telephone 150 then analyzes the initial digits of the entered phone number to determine the nature of the phone call that the user desires to be placed.

The telephone 150 determines whether the first digit of the entered phone number is "one" (step 502). If the entered first digit is a "one", it is assumed that the phone number entered by the user will be a long distance phone number, in which case, the telephone 150, without recalling the activated preceding number, transmits the entered first digit (in this case, "one") to POTS 110 (step 503). The user then enters the remaining digits of the long distance phone number (step 504) into the keypad 106, and in response, the telephone 150 transmits the remaining digits of the long distance phone number to POTS 110 (step 505).

If the entered first digit is not a "one," the telephone 150 determines if the user intends to dial a local phone number or a special phone number. Specifically, the telephone 150 makes a threshold determination as to whether the entered first digit is a "four" or "nine" (step 506). If not, it is assumed that the phone number entered by the user will be a local phone number. In response, the telephone 150 recalls the activated preceding number (step 507), and then sequentially transmits the recalled preceding number and the first digit of the local phone number entered by the user to POTS 110 (step 508). The user then enters the remaining digits of the local phone number into the keypad 106 (step 509), and in response, the telephone 150 transmits these digits to POTS 110 (step 510).

If, at step 506, the entered first digit is a "four" or a "nine," the telephone 150 determines if the user is attempting to dial "411" or "911." Specifically, the user enters the second digit of the phone number into the keypad 106 (step 511). The telephone 150 then determines if the entered second digit is a "one" (step 512). If the entered second digit is not a "one," it is assumed that the phone number entered by the user will be a local phone number, in which case, the telephone 150 recalls the activated preceding number (step 513), and then sequentially transmits the recalled preceding number, and the first and second digits of the local phone number entered by the user to POTS 110 (step 514). The user then enters the remaining digits of the local phone number (step 509) into the keypad 106, and in response, the telephone 150 transmits these digits to POTS 110 (step 510).

If the entered second digit is a "one," the user enters the third digit of the phone number into the keypad 106 (step 515). The telephone 150 then determines if the entered third digit is a "one" (step 516). If the entered third digit is not a "one," it is assumed that the phone number entered by the user will be a local phone number, in which case, the telephone 150 recalls the activated preceding number (step 517), and then sequentially transmits the recalled preceding number and the first, second, and third digits of the local phone number entered by the user to POTS 110 (step 518). The user then enters the remaining digits of the local phone number into the keypad 106 (step 509), and in response, the telephone 150 transmits these digits to POTS 110 (step 510). If the entered third digit is a "one," it is assumed that the phone number entered by the user is a special service phone number, in which case, the telephone 150 transmits the first, second, and third digits of the special service phone number (in this case, "4-1-1" or "9-1-1") to POTS 110 (step 519).

Once the phone number is dialed, whether it be a local, long distance, or special service phone number, the corresponding phone call is placed by POTS 110 to the call destination (step 520). Once the call is completed, the user places the handset 104 back on the cradle 112 to place the telephone 150 in the on-hook state (step 521), thereby terminating communication with POTS 110.

Figure 14:
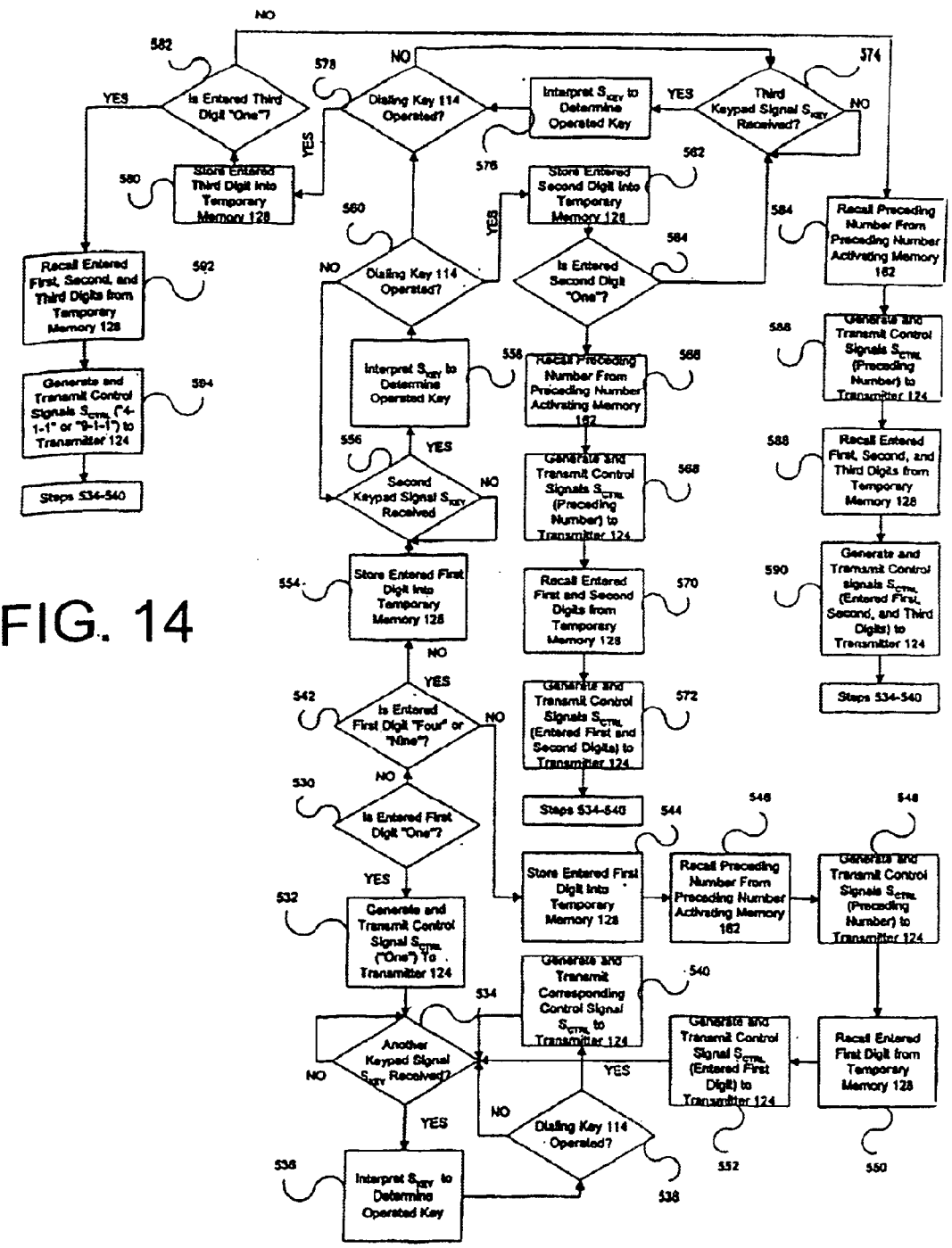
FIG. 14 is a flow diagram illustrating an alternative method used by a central processing unit (CPU) in performing various functions within the circuitry of FIG. 15.

Referring further to FIG. 14, operation of the CPU 158 in effecting the aforementioned phone number dialing function is described. For purposes of brevity in illustration and explanation, the "smart phone"/"standard phone" toggling, preceding number programming, and preceding number activation functions have been omitted, since they are identically performed as the corresponding functions are performed with respect to FIG. 8. Thus, it is assumed that one of the dialing keys 114 has been operated with the telephone 150 in the off-hook state.

The CPU 158 initially determines if the entered first digit is a "one" (step 530). If so, the CPU 158 generates and transmits a control signal $S_{CTRL}$ to the DTMF transmitter 124, which results in a DTMF signal representative of the entered first digit (in this case, "one") being transmitted to POTS 110 (step 532). The CPU 158 then determines if another keypad signal $S_{KEY}$ is received (step 534). If another keypad signal $S_{KEY}$ is not received, the process remains at step 534. If another keypad signal $S_{KEY}$ is received, the CPU 158 interprets the keypad signal $S_{KEY}$ to determine the corresponding key on the keypad 106 that was operated by the user (step 536). If a dialing key 114 was not operated (step 538), the CPU 158 ignores the keypad signal $S_{KEY}$ and returns to step 534. If a dialing key 114 was operated, the CPU 158 generates and transmits a control signal $S_{CTRL}$ representative of the entered digit to the DTMF transmitter 124 (step 540). This process is repeated at steps 534–540 until the telephone 150 is placed in an on-hook state, effectively terminating communication with POTS 110.

If, at step 530, the entered first digit is not a "one," the CPU 158 determines if the entered first digit is a "four" or "nine" (step 542). If not, the CPU 158 stores the entered first digit into the temporary memory 128 (step 544). The CPU 158 then recalls the preceding number from the memory 162 (step 546), and generates and transmits control signals $S_{CTRL}$ representative of the preceding number to the DTMF transmitter 124 (step 548). The CPU 158 then recalls the entered first digit from the temporary memory 128 (step 550), and generates and transmits a control signal $S_{CTRL}$ representative of the entered first digit to the DTMF transmitter 124 (step 552). The CPU 158 then goes to steps 534–540, wherein further DTMF signals are transmitted to POTS 110 if additional digits are entered by the user.

If, at step 542, the entered first digit is a "four" or "nine," the CPU 158 stores the entered first digit into the temporary memory 128 (step 554). The CPU 158 then determines if a second keypad signal $S_{KEY}$ is received (step 556). If a second keypad signal $S_{KEY}$ is not received, the process remains at step 556. If the second keypad signal $S_{KEY}$ is received, the CPU 158 interprets the keypad signal $S_{KEY}$ to determine the corresponding key on the keypad 106 that was operated by the user (step 558). If a dialing key 114 was not operated (step 560), the CPU 158 ignores the keypad signal $S_{KEY}$ and returns to step 556. If a dialing key 114 was operated, the CPU 158 stores the entered second digit into temporary memory 128 (step 562). The CPU 158 then determines if the entered second digit is a "one" (step 564). If not, the CPU 158 recalls the preceding number from the memory 162 (step 566), and generates and transmits control signals $S_{CTRL}$ representative of the preceding number to the DTMF transmitter 124 (step 568). The CPU 158 then recalls the entered first and second digits from the temporary memory 128 (step 570), and generates and transmits control signals $S_{CTRL}$ representative of the entered first and second digits to the DTMF transmitter 124 (step 572). The CPU 158 then goes to steps 534–540, wherein further DTMF signals are transmitted to POTS 110 if additional digits are entered by the user.

If, at step 564, the entered second digit is a "one," the CPU 158 determines if a third keypad signal $S_{KEY}$ is received (step 574). If a third keypad signal $S_{KEY}$ is not received, the process remains at step 574. If the third keypad signal $S_{KEY}$ is received, the CPU 158 interprets the keypad signal $S_{KEY}$ to determine the corresponding key on the keypad 106 that was operated by the user (step 576). If a dialing key 114 was not operated (step 578), the CPU 158 ignores the keypad signal $S_{KEY}$ and returns to step 578. If a dialing key 114 was operated, the CPU 158 stores the entered third digit into temporary memory 128 (step 580). The CPU 158 then determines if the entered third digit is a "one" (step 582). If not, the CPU 158 recalls the preceding number from the memory 162 (step 584), and generates and transmits control signals $S_{CTRL}$ representative of the preceding number to the DTMF transmitter 124 (step 586). The CPU 158 then recalls the entered first, second, and third digits from the temporary memory 128 (step 588), and generates and transmits control signals $S_{CTRL}$ representative of the entered first, second, and third digits to the DTMF transmitter 124 (step 590). The CPU 158 then goes to steps 534–540, wherein further DTMF signals are transmitted to POTS 110 if additional digits are entered by the user.

If, at step 582, it is determined that the entered third digit is a "one," the CPU 158 recalls the entered first, second, and third digits from the temporary memory 128 (step 592), and generates and transmits control signals $S_{CTRL}$ representative of the entered first, second, and third digits (in this case, "4-1-1" or "9-1-1") to the DTMF transmitter 124 (step 594). Although the phone call is made when these digits are dialed, and it is thus unnecessary to dial further digits, the CPU 158 then goes to steps 534–540, wherein further DTMF signals are transmitted to POTS 110 if additional digits are entered by the user, e.g., for conveying information to an automated telecommunications service.

Figure 15:
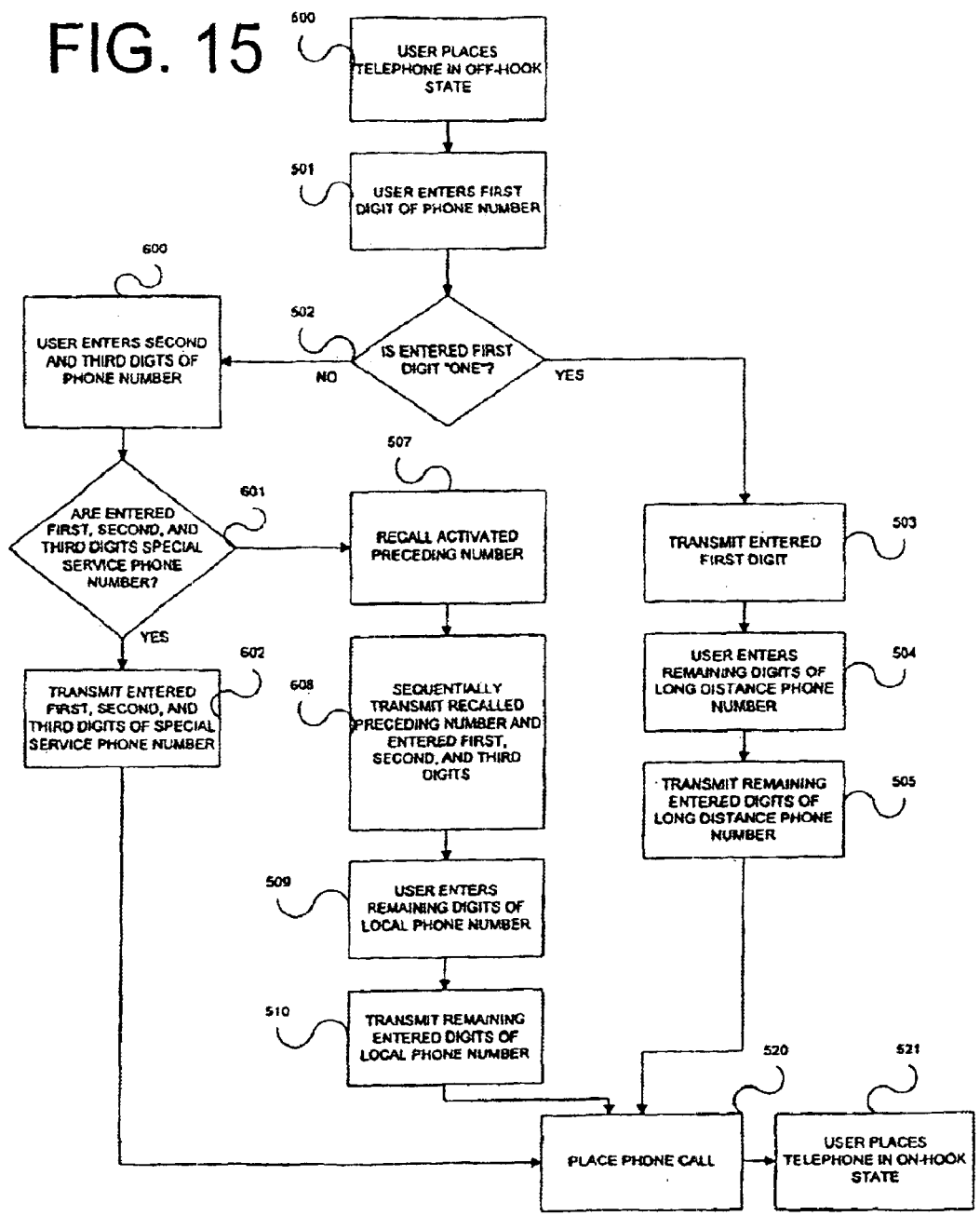
FIG. 15 is a flow diagram illustrating another alternative method used to dial a phone number with the telephone of FIG. 5.

It should be noted that the method of determining whether a special service number has been entered by the user should not be limited to that illustrated in FIGS. 13 and 14. For example, FIG. 15 illustrates another methodology that can be implemented into the telephone 150, such that placement of the telephone 150 in the "standard phone" mode is an unnecessary precedent to dialing these numbers. This methodology is similar to that described in FIG. 13 in that the telephone 150 analyzes the initial digits of the entered phone number to determine the nature of the entered phone number, and specifically, whether the phone number is a long distance phone number, local phone number, or special service phone number. It differs from that described in FIG. 13, however, in that the telephone 150 makes the determination only after the first three digits are entered. The methodology assumes that the phone number entered by the user is at least three digits. To the extent that the steps performed in the method of FIG. 15 are similar to those performed in the method of FIG. 13, identical reference numbers have been assigned.

In this regard, the user, after removing the handset 104 from the cradle 112, enters the first digit of the phone number, and the telephone 150 determines if the entered first digit is a "one" (steps 500–502). If the entered first digit is a "one," it is assumed the phone number entered by the user will be a long distance phone number, in which case, the telephone 150 dials the entered long distance phone number (steps 503–505). If the entered first digit is not a "one," the user enters the second and third digits of the phone number into the keypad 106 (step 600). The telephone 150 then determines if the entered first, second, and third digits represent a three-digit special service phone number, such as "4-1-1" or "9-1-1" (step 601). If not, it is assumed the phone number entered by the user will be a local phone number, in which case, the telephone 150 recalls the activated preceding number (step 507), and then sequentially transmits the recalled preceding number and the entered first, second, and third digits to POTS 110 (step 608). The user then enters the remaining digits of the local phone number into the keypad 106 (step 509), and in response, the telephone 150 transmits these digits to POTS 110 (step 510).

If, at step 601, the entered first, second, and third digits represent a special service phone number, it is assumed that the phone number entered by the user is a special service phone number, in which case, the telephone 150 transmits the first, second, and third digits of the special service phone number to POTS 110 (step 602). Whether special service, local, or long distance, the phone call is placed and, once completed, the user places the telephone 150 in the on-hook state (steps 520 and 521).

Figure 16:
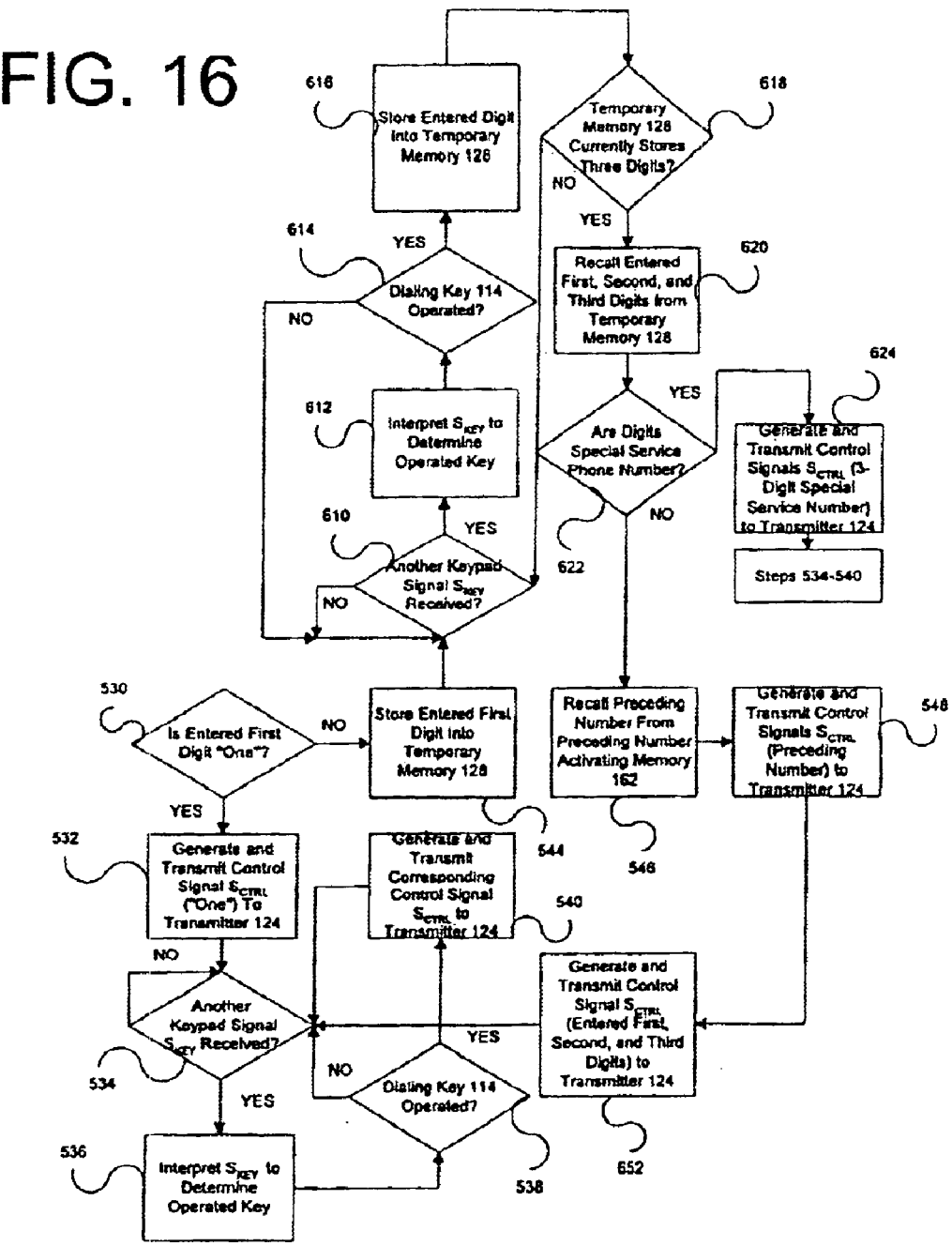
FIG. 16 is a flow diagram illustrating another alternative method used by a central processing unit (CPU) in performing various functions within the circuitry of FIG. 15.

Referring further to FIG. 16, operation of the CPU 158 in effecting the aforementioned phone number dialing function is described. Again, for purposes of brevity in illustration and explanation, the "smart phone"/"standard phone" toggling, preceding number programming, and preceding number activation functions have been omitted, since they are identically performed as the corresponding functions are performed with respect to FIG. 8. Thus, it is assumed that one of the dialing keys 114 has been operated with the telephone 150 in the off-hook state. To the extent that the steps performed in the method of FIG. 16 are similar to those performed in the method of FIG. 14, identical reference numbers have been assigned.

To this end, the CPU 158 determines if the entered first digit is a "one," and if so, dials the digits of the phone number as they are entered in by the user (steps 530–540). If the entered first digit is not a "one," the CPU 158 initially stores the entered first digit into temporary memory 128 (step 544), and then determines if another keypad signal $S_{KEY}$ is received (step 610). If another keypad signal $S_{KEY}$ is not received, the process remains at step 610. If another keypad signal $S_{KEY}$ is received, the CPU 158 interprets the keypad signal $S_{KEY}$ to determine the corresponding key on the keypad 106 that was operated by the user (step 612). If a dialing key 114 was not operated (step 614), the CPU 158 ignores the keypad signal $S_{KEY}$ and returns to step 610. If a dialing key 114 was operated, the CPU 158 stores the entered digit into temporary memory 128 (step 616).

The CPU 158 then determines if the temporary memory 128 currently stores three digits (step 618). If not, it returns to step 610. If so, the CPU 158 recalls the entered first, second, and third digits from the temporary memory 128 (step 620), and determines if these three digits represent a special service phone number, such as "4-1-1" or "9-1-1" (step 622). If the three digits do not represent a special service phone number, the CPU 158 recalls the preceding number from the memory 162 (step 546), and generates and transmits control signals $S_{CTRL}$ representative of the preceding number to the DTMF transmitter 124 (step 548). The CPU 158 then generates and transmits control signals $S_{CTRL}$ representative of the entered first, second, and third digits to the DTMF transmitter 124 (step 652). The CPU 158 then goes to steps 534–540, wherein further DTMF signals are transmitted to POTS 110 if additional digits are entered by the user.

If the three digits do represent a special service phone number, the CPU 158 generates and transmits control signals $S_{CTRL}$ representative of the entered first, second, and third digits to the DTMF transmitter 124 (step 624). Although the phone call is made when these digits are dialed, and it is thus unnecessary to dial further digits, the CPU 158 then goes to steps 534–540, wherein further DTMF signals are transmitted to POTS 110 if additional digits are entered by the user.

It should be noted that, although the methodologies illustrated in FIGS. 13–16 have been described with respect to the telephone 150, they can also be implemented within the telephones 100 and 180 in a similar manner and with similar results. It should also be noted that, when describing the above-described telephones 100, 150, and 180, it has been assumed for purposes of brevity in explanation that the user always desires to make a direct domestic phone call when using the telephone. If the user desires to make a phone call via an operator by dialing "0" or making a direct or operator assisted international call by dialing "01" or "011," the first entered digit will be a "zero," in which case, the telephone preferably operates in much the same manner as that when the user first enters the digit "one." That is, the telephone does not recall and dial a stored area code or preceding number in response to an entered first digit that is not the digit "one," if that entered first digit is a "zero," but rather merely dials the numbers as they are entered by the user through the keypad.

It should lastly be noted that, with respect to the telephones 100, 150, and 180, at least a one digit delay between the time that the user enters the first digit and the time that the respective telephone actually dials the first digit may be introduced when dialing a local or special service phone number. Without further modification, this may manifest itself as a situation where the user hears no audible tones when entering the digits, but subsequently hears one or more delayed audible tones corresponding to the entered digits.

This may be undesirable to the user, especially with regard to the methodologies illustrated in FIGS. 13–16, which may result in as much as a three-digit delay. Although the present inventions should not be so limited, to minimize the effect of this delay, a separate audible tone generator (not shown) is preferably coupled to the keypad circuitry, and is responsive to the keypad operation, generating audible tones to the user as the user enters digits into the keypad. This audible tone generator is separate from the dialing function of the telephone, and performs no function other than to generate user audible tones. The DTMF generator, which actually generates and transmits signals to POTS, is muted, so that the user does not hear two sets of signals. Thus, much like portable telephones, the user will hear audible tones in response to operation of the keypad, but will not hear audible tones when the corresponding signals are being transmitted from the telephone to POTS. Alternatively, if a local phone number is entered by the user, the CPU waits until all seven digits are entered before it generates and transmits control signals $S_{CTRL}$ to the DTMF transmitter. In this manner, although the DTMF generator is not muted, the user will not hear audible tones until after the entire local phone number has been entered.

Figure 17:
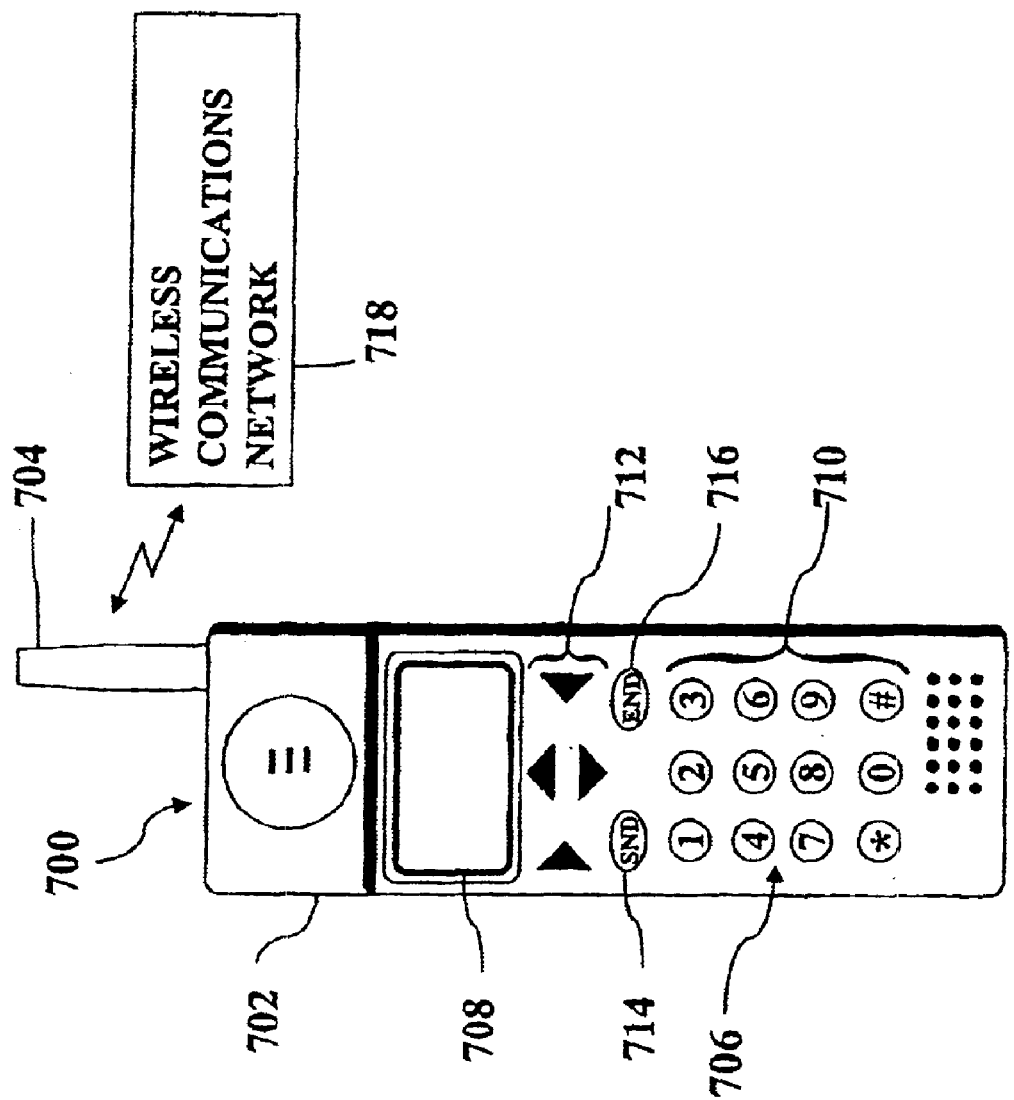
FIG. 17 is a plan view of another alternative preferred automatic preceding number dialing telephone constructed in accordance with the present inventions.

The dialing functions of the telephones 100, 150, and 180 illustrated above have been described as being accomplished merely in response to operation of the dialing keys. In many telephones, such as wireless and cellular telephones, the dialing functions are accomplished only after subsequent operation of a dedicated function key. Referring to FIG. 17, an automatic preceding number dialing telephone 700 constructed in accordance with the present inventions is described. The telephone 700 is illustrated as a wireless telephone that wirelessly communicates with a wireless communications network 718. Like the above-described telephones, the telephone 700 allows telephone calls to be made with a minimal amount of keystrokes.

The telephone 700 generally includes a telephone housing 702, an antenna 704, keypad 706, and a general purpose display 708. The telephone housing 702 houses circuitry, the function of which will be described below. Like the keypad 106 described above, the keypad 706 includes dialing keys 710, which encompass the numerical keys (i.e., the "zero" through "nine" keys), as well as "*" and "#" keys. The keypad 706 further includes menu function keys 712, which, in addition to providing the user with a means for selecting and programming various standard functions within the telephone 700, allows the user to alternately switch the telephone 700 between "smart phone" and "standard phone" modes, program the telephone 700 with a multitude of preceding numbers, and activate the telephone 700 with a selected one of the multitude of programmed preceding numbers. The programming and selection of these additional functions can be accomplished by the user in a manner similar to that in which the user performs and programs the basic functions of the telephone 700, and will therefore not be described in further detail herein for purposes of brevity.

The keypad 706 further includes a "send" key 714 and an "end" key 716. Upon operation of the "send" key 714, the telephone 700, via the antenna 704, wirelessly initiates communication with the wireless communications network 718 and transmits a telephone number entered into the telephone 700 thereto. At this point, it can be said that the telephone 700 is in an off-hook state. Upon operation of the "end" key 716, the telephone 700 terminates communication with the wireless communications network 718, placing the telephone 700 in an on-hook state.

The display 708, which in the preferred embodiment, is an LCD, exhibits the status of the functions when the user properly operates the menu selection keys 712. This exhibited status includes the identification of the preceding numbers programmed into the telephone 700, the preceding number with which the telephone 700 is currently activated, and the "smart phone" and "standard phone" modes.

Like the above-described telephone 150, the telephone 700 can be advantageously operated in an area code overlay region in which the telephone 700 is installed, such that the area code overlay region is transparent to the user, or optionally operated to call a frequently called area code. Thus, two of the preceding numbers programmed into the telephone 700 may contain the base area code and the overlaying area code, and the a remaining preceding number programmed into the telephone 700 may contain an area code that is most frequently dialed by the user when making a long distance call or a multi-digit long distance access number.

Figure 18:
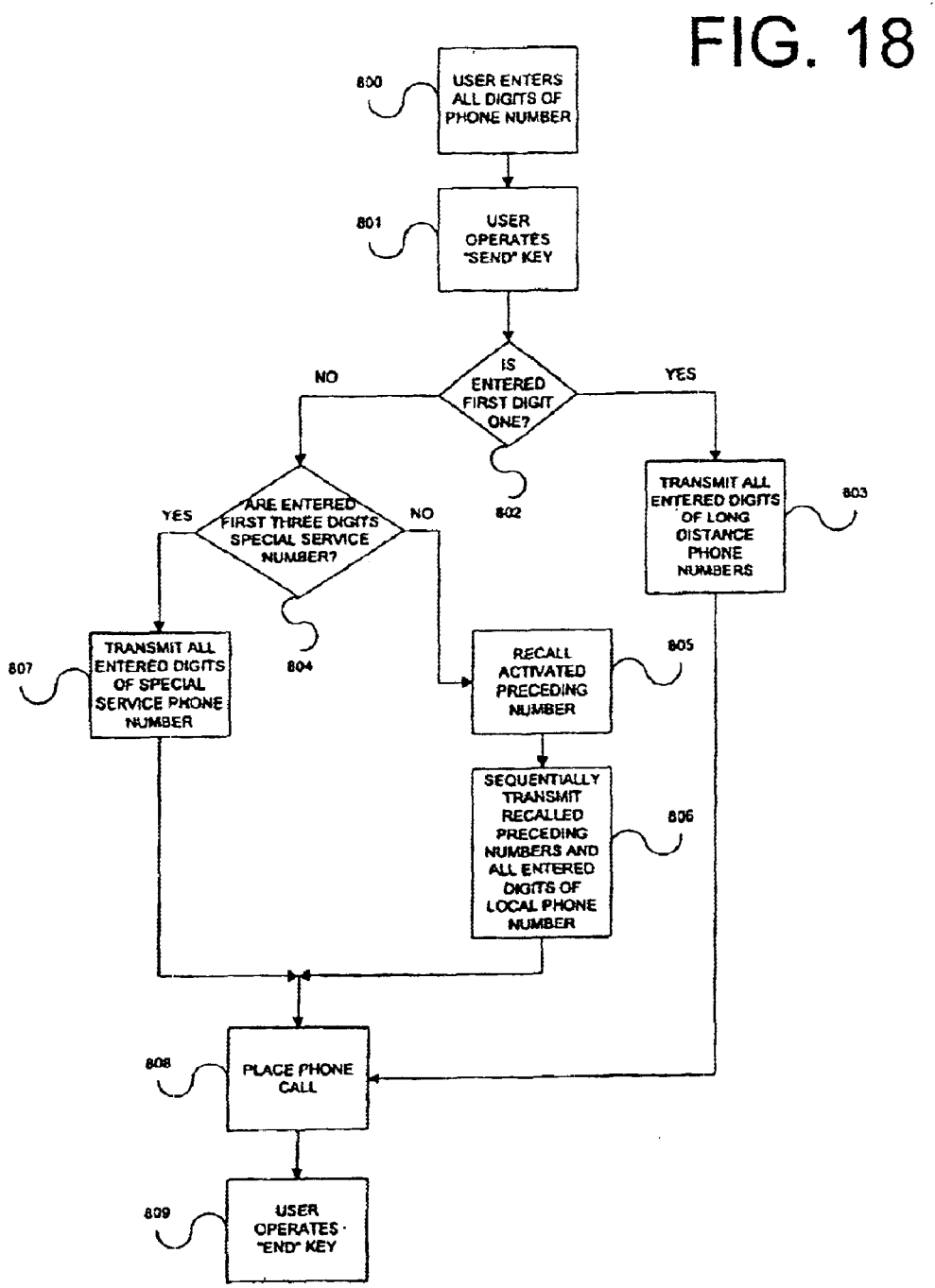
FIG. 18 is a flow diagram illustrating a method used to dial a phone number with the telephone of FIG. 17.

With further reference to FIG. 18, a method for dialing the telephone 700 is performed in accordance with the present inventions. It is presumed that, at this point, the telephone 700 has been placed into the "smart phone" mode. The process begins with the user entering all the digits of a phone number, e.g., three digits of a special service phone number, seven digits of a local phone number, or eleven digits of a long distance phone number (step 800). The user then operates the "send" key 714 (step 801), establishing communication with the wireless communications network 718 and initiating the calling process. The telephone 700 then analyzes the initial digits of the entered phone number to determine the nature of the entered phone number.

Specifically, the telephone 700 determines if the entered first digit is a "one" (step 802). If the entered first digit is a "one", it is assumed that the phone number entered by the user is a long distance phone number, in which case, the telephone 700, without recalling the activated preceding number, wirelessly transmits all the digits of the entered phone number to the wireless communications network 718 (step 803). If the entered first digit is not a "one," the telephone 700 determines if the entered first three digits of the phone number represent a three-digit special service phone number, such as "4-1-1" or "9-1-1" (step 804). If not, it is assumed that the phone number entered by the user is a local phone number, in which case, the telephone 150 recalls the activated preceding number (step 805), and then sequentially wirelessly transmits the recalled preceding number and all the digits of the entered phone number to the wireless communications network 718 (step 806). If, at step 804, the entered first three digits represent a special service phone number, it is assumed that the phone number entered by the user is a special service phone number, in which case, the telephone 700 transmits all the digits of the entered phone number (in this case, three digits of the special service phone number) to the wireless communications network 718 (step 807).

Once the phone number is dialed, whether it be a local, long distance, or special service phone number, the corresponding phone call is placed by the wireless communications network 718 to the call destination (step 808). Once the call is completed, the user operates the "end" key 716 (step 809), thereby terminating communication with the wireless communications network 718.

Figure 19:
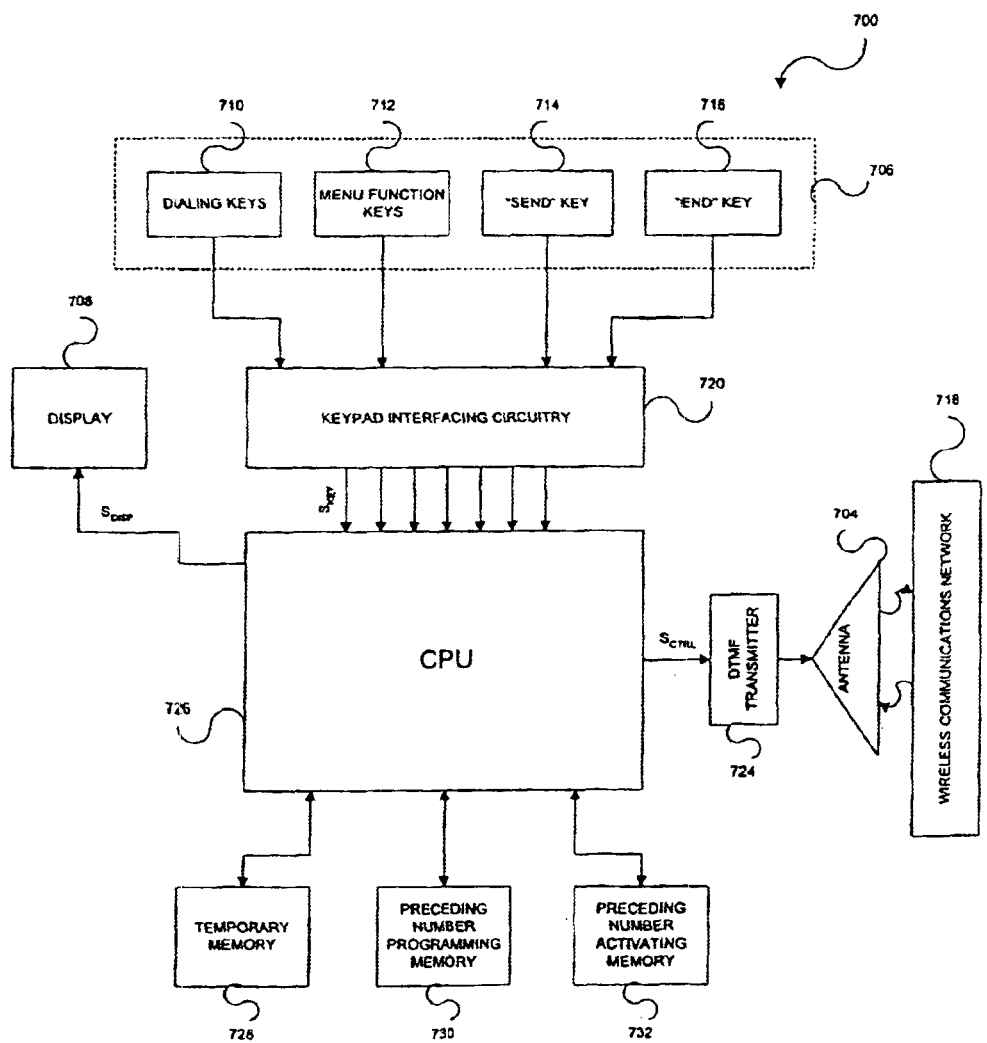
FIG. 19 is a block diagram of the circuitry implemented in the telephone of FIG. 17.

With reference to FIG. 19, the telephone circuitry used to implement the dialing functions described above is described. In general, this circuitry includes the above-described display 708, antenna 704, and keypad 706, which includes the dialing keys 710, menu function keys 712, "send" key 714, and "end" key 716. The telephone circuitry further includes keypad interfacing circuitry 720, transmitter 724 (in this case, a dual tone multi-frequency (DTMF) transmitter), control circuitry 726 (in this case, a central processing unit (CPU)), temporary memory 728, preceding number programming memory 730, and preceding number activating memory 732.

The display 708, keypad interfacing circuitry 120, menu function keys 712, "send" key 714, "end" key 716, and DTMF transmitter 724 are all standard components in the wireless telephone manufacturing industry, and are well understood by those skilled in the art of wireless telephone manufacturing. The keypad interfacing circuitry 720 is coupled between the keypad 706 and the CPU 726, and is configured for transmitting keypad signals $S_{KEY}$ to the CPU 726 in response to operation of the keypad 706 by the user. That is, the keypad interfacing circuitry 720 generates and transmits a keypad signal $S_{KEY}$ to the CPU 726 corresponding to one of the dialing keys 710, menu function keys 712, "send" key 714, and "end" key 716. The CPU 726 is coupled to the display 708, and is configured for generating and transmitting a display signal $S_{DISP}$ to prompt the display 708 to exhibit, among other things, the digits of a phone number as they are entered into the keypad 706. The CPU 726 is coupled to the DTMF transmitter 724, and is configured for generating and transmitting control signals $S_{CTRL}$ for prompting the DTMF transmitter 724 to generate and wirelessly transmit DTMF signals corresponding with the digits of a phone number to the wireless communications network 718 via the antenna 704. In effect, the CPU 726 employs the DTMF transmitter 724 to place a call via the wireless communications network 718.

The CPU 726 is coupled to the preceding number programming memory 730 and is configured for storing preceding numbers therein during the preceding number programming process. The CPU 726 is coupled to the preceding number activating memory 732, and is further configured for storing a selected preceding number therein after selection, and recalling it during the phone number dialing process. The preceding number programming and activation processes can be conveniently performed using the menu function keys 712 and dialing keys 710 in a standard manner. The CPU 726 is also coupled to the temporary memory 728 and is configured for storing temporary information, and specifically, the digits of the phone number as they are entered by the user during the calling process, as will be described in further detail below. It should be noted that, although the temporary memory 728, preceding number programming memory 730 and preceding number activating memory 732 are illustrated as discrete components, they can be conveniently embodied in a single memory device, or even in the CPU 726 itself.

Figure 20:
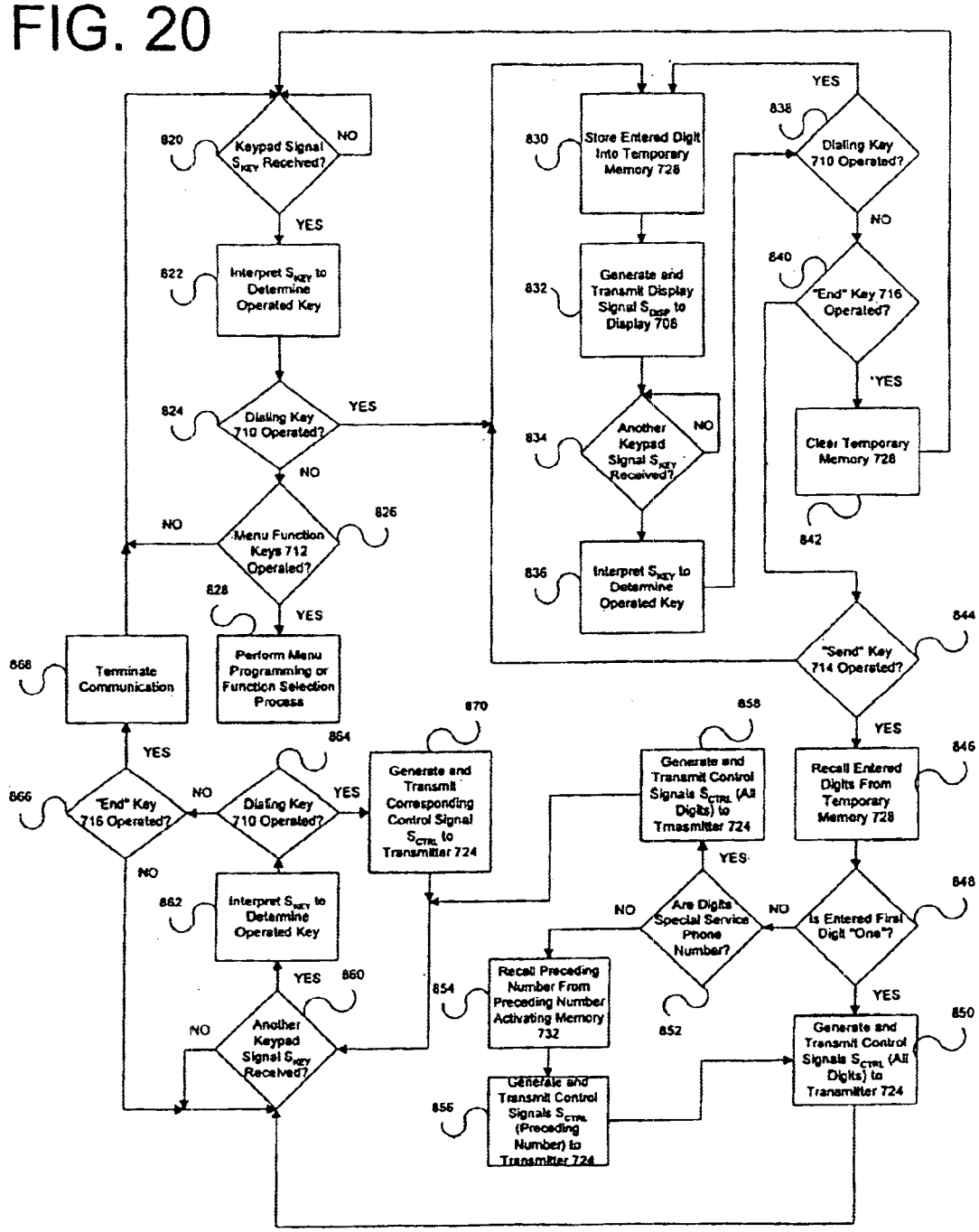
FIG. 20 is a flow diagram illustrating a method used by a central processing unit (CPU) in performing various functions within the circuitry of FIG. 17.

Referring further to FIG. 20, operation of the CPU 726 in effecting the aforementioned phone number dialing function is described. To this end, the CPU 726 determines if a keypad signal $S_{KEY}$ has been received from the keypad interfacing circuitry 120 (step 820). If a keypad signal $S_{KEY}$ has not been received, the process remains at step 820. If a keypad signal $S_{KEY}$ has been received, the CPU 726 interprets the keypad signal $S_{KEY}$ to determine the corresponding key on the keypad 706 that was operated by the user (step 822). If one of the dialing keys 710 was operated (step 824), the CPU 726 performs the calling process, as will be described in further detail below. If one of the menu function keys 712 was operated (step 826), the CPU 726 performs the menu programming or function selection process (step 828). If one of the menu function keys 712 was not operated, indicating that either the "send" key 714 or "end" key 716 was operated, the keypad signal $S_{KEY}$ is ignored, and the process remains at step 820.

Turning now to the dialing process, the CPU 726 stores the entered digit into temporary memory 728 (step 830) and generates and transmits a display signal $S_{DISP}$ to the display 708, thereby exhibiting the newly entered digit to the user (step 832). The CPU 726 then determines if another keypad signal $S_{KEY}$ is received (step 834). If another keypad signal $S_{KEY}$ is not received, the process remains at step 834. If another keypad signal $S_{KEY}$ is received, the CPU 726 interprets the keypad signal $S_{KEY}$ to determine the corresponding key on the keypad 706 that was operated by the user (step 836). If a dialing key 710 was operated, the process returns to step 830. If, at step 838, a dialing key 710 was not operated, the CPU 726 determines if the "end" key 716 was operated by the user (step 840). If so, the CPU 726 clears the temporary memory 728 (step 842), and the process returns to step 820. If not, the CPU 726 determines if the "send" key 714 was operated by the user (step 844). If the "send" key was not operated, the CPU 726 ignores the keypad signal $S_{KEY}$ and returns to step 830. If the "send" key 714 was operated, the CPU 726 recalls the entered digits of the phone number from the temporary memory 728 (step 846), and determines if the entered first digit is a "one" (step 848).

If so, the CPU 726 generates and transmits control signals $S_{CTRL}$ representative of all the entered digits of the phone number to the DTMF transmitter 724 (step 850). If not, the CPU 726 determines if the first three digits represent a special service phone number, such as "4-1-1" or "9-1-1" (step 852). If the three digits do not represent a special service phone number, the CPU 726 recalls the preceding number from the preceding number activating memory 732 (step 854), and generates and transmits control signals $S_{CTRL}$ representative of the preceding number to the DTMF transmitter 724 (step 856). The CPU 726 then transmits control signals $S_{CTRL}$ representative of all the entered digits to the DTMF transmitter 724 (step 850). If the three digits do represent a special service phone number, the CPU 726 transmits control signals $S_{CTRL}$ representative of the entered first, second, and third digits to the DTMF transmitter 724 (step 858).

Once a call is established, the CPU 726 then goes to steps 860–870, wherein further DTMF signals are transmitted to wireless communications network 718 if additional digits are entered by the user. Specifically, the CPU 726 determines if another keypad signal $S_{KEY}$ is received (step 860). If another keypad signal $S_{KEY}$ is not received, the process remains at step 860. If another keypad signal $S_{KEY}$ is received, the CPU 726 interprets the keypad signal $S_{KEY}$ to determine the corresponding key on the keypad 706 that was operated by the user (step 862). If a dialing key 710 was not operated (step 864), the CPU 726 determines if the "end" key 716 was operated (step 866). If it was, communication with the wireless communications network 718 is terminated (step 868), and the process returns to step 820. If it was not, the CPU 726 ignores the keypad signal $S_{KEY}$ and returns to step 860, where it is determined if another keypad signal $S_{KEY}$ has been received. If a dialing key 710 was operated, the CPU 726 generates and transmits a control signal $S_{CTRL}$ representative of the entered digit to the DTMF transmitter 724 (step 870). The process then returns to step 860, where it is determined if another keypad signal $S_{KEY}$ has been received.

Figure 21:
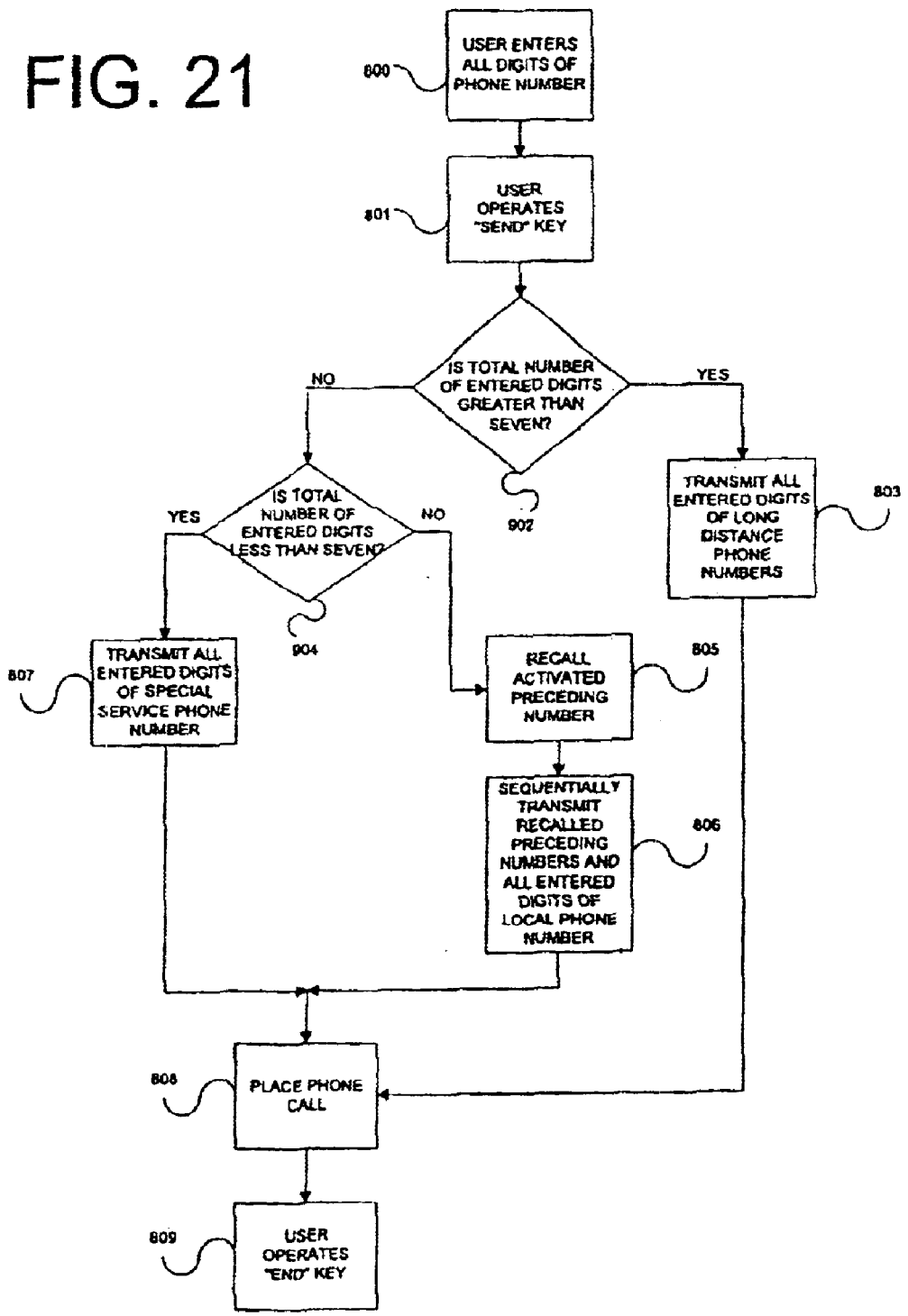
FIG. 21 is a flow diagram illustrating an alternative method used to dial a phone number with the telephone of FIG. 17.

FIG. 21 illustrates an alternative methodology that can be implemented into the telephone 700. This methodology is similar to that described in FIG. 18 in that the dialing function is accomplished in response to operation of the "send" key 714. It differs from that described in FIG. 18, however, in that the total number, rather than the character, of the digits in the phone number are analyzed to determine the nature of the phone number. For example, if it is known that the total number of digits of a local phone number is seven and the total number of digits of a special service phone number is three, the telephone 700 can distinguish between a long distance phone number, local phone number, or special service phone number by determining the total number of digits of the phone number entered by the user. This can be advantageous, since user entry of a special service phone number is assumed if the phone number contains a predetermined number of digits, thereby obviating the need to program specific special service phone numbers into the telephone 700. To the extent that the steps performed in the method of FIG. 21 are a similar to those performed in the method of FIG. 18, identical reference numbers have been assigned.

In this regard, the user enters the digits of the phone number and operates the "send" key 714 (steps 800 and 801). The telephone 700 then determines if the total number of digits contained in the phone number entered by the user is greater than seven digits (step 902). If so, it is assumed that the phone number entered by the user is a long distance phone number, in which case, the telephone 700 dials the entered long distance phone number (step 803). If not, the telephone 700 determines if the total number of digits contained in the phone number entered by the user is less than seven digits (step 904). If not, it is assumed that the phone number entered by the user is a local phone number, in which case, the telephone 700 dials a long distance phone number containing the entered local phone number (steps 805 and 806). If so, it is assumed that the phone number entered by the user is a special service phone number, in which case, the telephone 700 dials the special service phone number (step 807). Regardless of the nature of the phone number entered by the user, the phone call is placed and the user operated the "end" key 716, thereby terminating communication with the wireless communications network 718 (steps 808 and 809).

Figure 22:
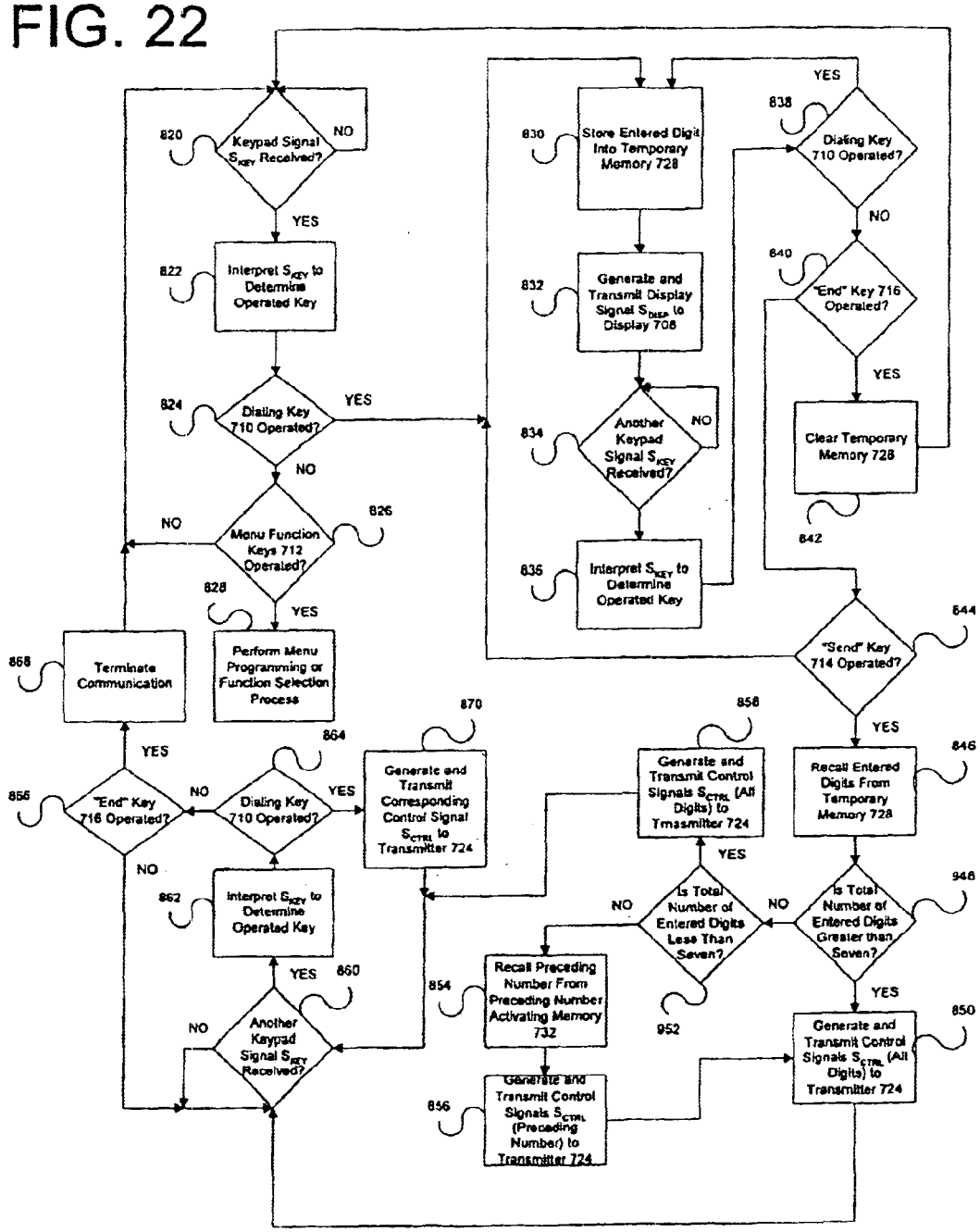
FIG. 22 is a flow diagram illustrating an alternative method used by a central processing unit (CPU) in performing various functions within the circuitry of FIG. 17.

Referring further to FIG. 22, operation of the CPU 726 in effecting the aforementioned phone number dialing function is described. The steps performed by the CPU 726 in performing the dialing function illustrated in FIG. 22 is identical to that illustrated in FIG. 20, with the exception that the nature of the phone number entered by the user is determined based on the total number of digits, rather than the character of the digits, contained within the phone number. To the extent that the steps performed in the method of FIG. 22 are similar to those performed in the method of FIG. 20, identical reference numbers have been assigned. In this regard, all steps illustrated in FIG. 20 are identically performed, with the exception of steps 848 and 852, which have been replaced with steps 948 and 952, where the CPU 726 determines the nature of the phone number.

Specifically, the CPU 726 performs the initial dialing steps, which includes storing the digits entered by the user into temporary memory 728 (steps 820–844). Once the entered digits are recalled from the temporary memory 728 (step 846) subsequent to operation of the "send" key 714 (step 844), the CPU 726 determines if the total number of entered digits is greater than seven digits (step 948). If so, the CPU 726 generates and transmits control signals $S_{CTRL}$ representative of all the entered digits of the phone number to the DTMF transmitter 724 (step 850). If not, the CPU 726 determines if the total number of entered digits is less than seven digits (step 952). If not, the CPU 726 recalls the preceding number from the preceding number activating memory 732, generates and transmits control signals $S_{CTRL}$ representative of the preceding number to the DTMF transmitter 724, and then transmits control signals $S_{CTRL}$ representative of all the entered digits to the DTMF transmitter 724 (steps 854, 856, and 860). If so, the CPU 726 transmits control signals $S_{CTRL}$ representative of the entered first, second, and third digits to the DTMF transmitter 724 (step 858). Once the call is made, the CPU 726 performs a further dialing sequence if necessary (steps 860–870).

It should be noted that, although the methodologies illustrated in FIGS. 18–22 effect efficient dialing techniques by recalling preceding numbers, they can be used to effect efficient dialing techniques by recalling area codes, such as that described in FIG. 2, or recalling preceding numbers in response to dedicated function keys, such as that described in FIG. 10.

It should also be noted that, when describing the above-described telephone 700, it has been assumed for purposes of brevity in explanation that the user always desires to make a direct domestic phone call when using the telephone. If the user desires to make a phone call via an operator by dialing "0" or make a direct or operator assisted international call by dialing "01" or "011," the telephone 700 will dial it without recalling a preceding number. That is, in the methodology illustrated in FIG. 18, the first entered digit of these phone numbers is a "zero," in which case, the telephone 700 operates in much the same manner as that when the user first enters the digit "one." In the methodology illustrated in FIG. 21, these phone numbers have less than seven digits, in which case, the telephone 700 operates in much the same manner as that when the user enters a special service phone number. Thus, in either methodology, the telephone 700 does not recall and dial a stored area code or preceding number in response to the numbers "0," "01," or "011," but rather merely dials the numbers as they are entered by the user through the keypad.

It should also be noted that, while the above-described preferred embodiments and methods have been described as being directed to self-contained telephones, thereby providing an efficient dialing methodology to portable and/or home-based consumer products, the afore-described structure and methods can also be implemented within telephonic-based systems without straying from the principles taught by the present inventions.

While preferred methods and embodiments have been shown and described, it will be apparent to one of ordinary skill in the art that numerous alterations may be made without departing from the spirit or scope of the invention. Therefore, the invention is not to be limited except in accordance with the following claims.

We claim:

1. A method for dialing a phone number having an area code and a local phone number, comprising:

storing the area code within a self-contained telephonic apparatus;

selecting the area code for recall prior to initiating entry of the local phone number into the telephonic apparatus;

entering the local phone number into the telephonic apparatus;

automatically recalling the selected area code in response to the entry of the local phone number; and sequentially transmitting the recalled area code and entered local phone number from the telephonic apparatus.

2. The method of claim 1, wherein the recalled area code and entered local phone number are transmitted from an area code overlay region, and the stored area code is the base area code of the area code overlay region.

3. The method of claim 1, wherein the recalled area code and entered local phone number are transmitted from an area code overlay region, and the stored area code is the overlaying area code of the area code overlay region.

4. The method of claim 1, wherein the recalled area code and entered local phone number are transmitted from a standard area code region having a first area code, and the stored area code is a second area code different from the first area code.

5. The method of claim 1, further comprising transmitting a long distance access number prior to transmitting the recalled area code.

6. The method of claim 5, wherein the long distance access number is the digit "one."

7. The method of claim 5, wherein the long distance access number is a multi-digit number that includes the digit "one" as the first digit.

8. The method of claim 1, further comprising:
storing a long distance access number within the telephonic apparatus;
recalling the stored long distance access number in response to the entered local phone number; and
transmitting the recalled long distance access number prior to transmitting the recalled area code.

9. The method of claim 1, wherein the recalled area code and entered local phone number are transmitted by generating corresponding DTMF signals.

10. The method of claim 1, further comprising storing a plurality of area codes within the telephonic apparatus, and selecting one of the plurality of area codes for recall, wherein the recalled area code is the selected one of the plurality of area codes.

11. The method of claim 1, wherein the telephonic apparatus comprises an area code programming key, and the area code is stored by operating the area code programming key.

12. The method of claim 1, further comprising displaying the selected area code on the telephonic apparatus.

13. The method of claim 1, wherein the telephonic apparatus is a telephone.

14. The method of claim 1, wherein the local phone number is entered by sequentially entering one or more initial digits and remaining digits, the area code is recalled in response to entry of the last of the one or more initial digits, and the area code, one or more initial digits, and remaining entered digits are sequentially transmitted.

15. The method of claim 14, further comprising:
storing the one or more initial digits; and
recalling the stored area code prior to transmitting the one or more initial digits.

16. The method of claim 14, wherein the one or more initial digits is the first digit.

17. The method of claim 1, wherein the area code is recalled in response to an operation of a phone number transmission key.

18. A method for making a call from a self-contained telephonic apparatus, comprising:
storing an area code within the telephonic apparatus;
selecting the stored area code for recall prior to initiating entry of a phone number into the telephonic apparatus;
entering the phone number into the telephonic apparatus;
determining if the entered phone number is a local phone number;
if the entered phone number is a local phone number, automatically recalling the selected area code in response to the entry of the phone number, and sequentially transmitting the recalled area code and the entered phone number from the telephonic apparatus; and
if the entered phone number is not a local phone number, transmitting the entered phone number from the telephonic apparatus without transmitting the selected area code.

19. The method of claim 18, wherein the phone number is transmitted from an area code overlay region.

20. The method of claim 18, wherein the phone number is transmitted from a standard area code region.

21. The method of claim 18, further comprising transmitting a long distance access number prior to transmitting the recalled area code if the entered phone number is a local phone number.

22. The method of claim 21, wherein the first digit of the long distance access number is the digit "one."

23. The method of claim 21, wherein the long distance access number is a multi-digit number that includes the digit "one" as the first digit.

24. The method of claim 18, further comprising:
storing a long distance access number within the telephonic apparatus; and
if the entered phone number is a local phone number, recalling the long distance access number in response to entry of the phone number, and sequentially transmitting the recalled long distance access number, recalled area code, and entered phone number.

25. The method of claim 18, wherein the telephonic apparatus is a telephone.

26. The method of claim 18, wherein the local phone number determination comprises determining a characterization of one or more digits contained with the phone number.

27. The method of claim 26, wherein the entered phone number is determined to be a local phone number if a first digit of the entered phone number is not the first digit of a long distance access number.

28. The method of claim 26, wherein the entered phone number is determined to be a local phone number if a first digit of the entered phone number is not the first digit of a long distance access number, and the one or more digits do not represent a special service phone number.

29. The method of claim 18, wherein the local phone number determination comprises determining a total number of digits contained with the entered phone number.

30. The method of claim 29, wherein the entered phone number is determined to be a local phone number if the entered phone number contains only seven digits.

31. A self-contained telephonic apparatus for dialing a phone number having an area code and a local phone number, comprising;
a memory configured for storing the area code;
a user interface configured for allowing a user to select the stored area code for recall and to enter the local phone number;
a transmitter;
control circuitry coupled to the user interface and configured for receiving the entered local phone number from the user interface, the control circuitry coupled to the memory, and configured for automatically recalling the selected area code from the memory in response to entry of the local phone number, the control circuitry coupled to the transmitter, and configured for controlling the transmitter to sequentially transmit the recalled area code and entered local phone number; and a housing containing the user interface, memory, transmitter, and control circuitry.

32. The telephonic apparatus of claim 31, wherein the user interface is a keypad.

33. The telephonic apparatus of claim 31, wherein the memory is non-volatile.

34. The telephonic apparatus of claim 31, wherein the transmitter is a DTMF transmitter.

35. The telephonic apparatus of claim 31, wherein the control circuitry comprises a central processing unit.

36. The telephonic apparatus of claim 31, wherein the memory is configured for storing a long distance access number, and the control circuitry is further configured for recalling the long distance access number from the memory, and for controlling the transmitter to transmit the recalled long distance access number prior to transmitting the recalled area code.

37. The telephonic apparatus of claim 31, wherein the user interface comprises a keypad having a plurality of area code selection keys, the memory is configured for storing a plurality of area codes, and the control circuitry is further configured for selecting one of the plurality of area codes from the memory in response to operation of a corresponding one of the plurality of area code selection keys, wherein the recalled area code is the selected area code.

38. The telephonic apparatus of claim 31, wherein the user interface comprises a keypad having an area code programming key, and is further configured for allowing the user to enter the area code, and the control circuitry is further configured for receiving the entered area code, and storing the received area code in the memory in response to operation of the area code programming key.

39. The telephonic apparatus of claim 31, wherein the area code programming key is a dedicated area code programming key.

40. The telephonic apparatus of claim 31, wherein the area code programming key is a non-dedicated area code programming key.

41. The telephonic apparatus of claim 31, further comprising a display coupled to the control circuitry, wherein the control circuitry is configured for controlling the display to exhibit the stored area code.

42. The telephonic apparatus of claim 31, wherein the control circuitry is configured for recalling the area code in response to the last of one or more initial digits of the entered local phone number.

43. The telephonic apparatus of claim 42, wherein the control circuitry is further configured for storing the one or more initial digits in the memory when entered, and recalling the stored one or more initial digits after the recalled area code has been transmitted.

44. The telephone apparatus of claim 31, wherein the user interface comprises a phone number transmission key, and the control circuitry is configured for recalling the area code in response to operation of the phone number transmission key.

45. A self-contained telephonic apparatus for making a call, comprising:

a memory configured for storing an area code;

a user interface configured for allowing a user to select the stored area code for recall and to enter the local phone number;

a transmitter; and control circuitry coupled to the user interface, memory, and transmitter, the control circuitry configured for receiving the phone number from the user interface, for determining if the received phone number is a local phone number, for automatically recalling the selected area code from the memory and controlling the transmitter to sequentially transmit the recalled area code and received phone number if the received phone number is a local phone number, and for controlling the transmitter to transmit the received phone number without transmitting the area code if the received phone number includes a long distance access number; and a housing containing the user interface, memory, transmitter, and control circuitry.

46. The telephonic apparatus of claim 45, wherein the control circuitry is further configured for controlling the transmitter to transmit a long distance access number prior to transmitting the recalled area code if the received phone number is a local phone number.

47. The telephonic apparatus of claim 45, wherein the control circuitry is configured for determining if the received phone number is a local phone number by determining a characterization of one or more digits contained with the received phone number.

48. The telephonic apparatus of claim 45, wherein the control circuitry is configured for determining if the received phone number is a local phone number by determining a total number of digits contained with the received phone number.

* * * * *